United States Patent [19]
Attridge et al.

[11] 3,760,377
[45] Sept. 18, 1973

[54] HISTOGRAM DATA PROCESSOR

[75] Inventors: Curtis C. Attridge, Gaithersburg, Md.; Joseph G. Ayers, Jr., Endwell, N.Y.

[73] Assignee: International Business Machines Corporation, Armonk, N.Y.

[22] Filed: July 17, 1970

[21] Appl. No.: 55,713

[52] U.S. Cl. .............................................. 340/172.5
[51] Int. Cl. .............................................. G06f 7/00
[58] Field of Search .................... 340/172.5, 324 A, 340/146.3, 213; 328/14; 235/197, 196, 61.11 E, 150.27; 250/41.9 D, 43.5 R, 230 R; 324/140

[56] References Cited

UNITED STATES PATENTS 3,375,509 3/1968 Mullarkey .......................... 340/213
3,487,308 12/1969 Johnson ............................ 324/140

*Primary Examiner*—Raulfe B. Zache
*Attorney*—Hanifin and Jancin and Norman R. Bardales

[57] ABSTRACT

A histogram data processor that detects for the presence of and/or an intermediate class of the histogram data which has a lower frequency of occurrence that its adjacent classes. That is to say, the processor detects the particular intermediate class when such a condition is present and/or detects for the presence of such a condition in the data. Also, brightness level discriminator apparatus which includes the aforesaid processor to process brightness level data derived from a field of view to detect the presence and/or location of an object in the field. Also, an autonomous nagivation system for a moving craft which includes the aforesaid apparatus for deriving positional information of the craft.

12 Claims, 22 Drawing Figures

INVENTORS
CURTIS C. ATTRIDGE
JOSEPH G. AYERS JR.

BY Norman R. Bardales
ATTORNEY

HISTOGRAM DATA PROCESSOR

BACKGROUND OF THE INVENTION

1. Field of the Invention

This invention is related to data processors and more particularly to histogram data processors.

2. Description of the Prior Art

Heretofore, in the prior art, histogram data processors were primarily concerned with statistical type compilation, that is to say the generation of the histogram algorithm per se. The prior art histogram processors did not, however, provide for the analysis of a certain characteristic of the histogram. This characteristic is referred to sometimes hereinafter as the DIP characteristic and may be defined as a low intermediate point in the corresponding histogram waveform. More specifically, it is the characteristic which is related to an intermediate class of the histogram that has a lower frequency of occurrence than its adjacent classes. Thus, the prior art processors were unable to detect for the presence of a multi-modal distribution in the histogram and/or to discriminate between data sub-sets associated with a histogram having a multi-modal distribution.

Moreover, in the past, brightness level discriminator apparatus of the prior art have been utilized for detection of an object in a field of view. For example, in a typical analog type discriminator of the prior art, a field of view is scanned by electro-optical transducer means. The transducer means converts the brightness levels of the points of the field to a corresponding analog electrical signal. The analog signal in turn is fed as an input signal to a comparator. The comparator includes plural comparator circuits, each of which compares the analog signal with a different fixed level reference signal. The reference signal levels correspond to preselected discrete brightness levels of interest. As a consequence, each comparator provides an output analog signal only when the amplitude of the input analog signal from the transducer means is above, or alternatively below, the level of the particular reference signal associated with the particular comparator circuit. The processing of the output signals is based on a priori or presumptive approach. That is to say, some decision is made beforehand that when the level of the input analog signal is below, or in the alternative case above, a certain selected one of the reference signal levels, it is considered associated with the background brightness levels of the field. On the other hand, when the level of the input analog signal is above, or in the alternative case is below, the certain selected reference signal level it is considered to be associated with the object's brightness levels. In certain applications, such prior art apparatus are usually adequate when the brightness level distribution pattern of the field of view is relatively simple. For example, such is the case in document reader applications where the document contains alpha-numeric characters which are provided with a high contrast, i.e. black, against a substantially white background. However, where the brightness level pattern of the field of view is subtle or more complex, the prior art apparatus lacks the ability to detect low contrast objects therein. In applications, for example, such as blood cell analysis, target identification for navigation or reconnaissance purposes and the like, as well as document readers in which low and/or multiple contrast characters are present, this inability is obviously a disadvantage and/or deleterious.

This prior art apparatus may be modified to shift or adjust the aforementioned certain selected reference signal level after each scan in order to detect low contrast objects in the field of view. In this manner, the field is successively scanned until an output analog signal or signals is or are detected. However, there is a practical limitation on the number of shifts or adjustments that can be made in any given system and thus there is no assurance that the modified apparatus will detect very low contrast objects. Moreover, each successive scan requires or uses additional data processing time. Thus, the modified apparatus is not reliable and/or conducive to processing the data on a substantially real time basis.

SUMMARY OF THE INVENTION

It is the object of this invention to provide a histogram data processor that detects for the presence of an intermediate class of the histogram data which has a lower frequency of occurrence than its adjacent classes and/or detects such a particular intermediate class.

Another object of this invention is to provide a histogram data processor that detects for a multi-modal distribution in the histrogram and/or discriminates between data sub-sets associated with a histogram having a multi-modal distribution.

Still another object of this invention is to provide brightness level discriminator apparatus which detects for the presence of an object and/or its location in a field of view on a reliable and substantially real time basis.

Still another object of this invention is to provide a brightness level discriminator apparatus of the aforementioned kind which is particularly useful for an autonomous navigation system.

According to one aspect of the invention, a data processing system is provided for processing a data signal representing a function having a variable parameter. The system includes converter means for converting the data signal into at least three converted signals proportional to the frequency distribution, i.e., frequency of occurrence, of the variable parameter, each of the converted signals being associated with a mutually exclusive different preselected value of the parameter. In addition, there is included detection means responsive to the aforementioned converted signals for detecting whether at least one of the converted signals associated with an intermediate one of the preselected values has a frequency less than the respective frequencies of the converted signals associated with the adjacent values thereto.

Other aspects of the invention include in combination a data processing system of the aforementioned kind and brightness level discriminator apparatus and/or an autonomous nagivational system.

The foregoing and other object, features and advantages of the invention will be apparent from the following more particular description of the preferred embodiments of the invention, as illustrated in the accompanying drawing.

BRIEF DESCRIPTION OF THE DRAWING

In the FIGURES, like elements are designated with similar reference numerals.

DESCRIPTION OF THE PREFERRED EMBODIMENTS

Figure 1A:
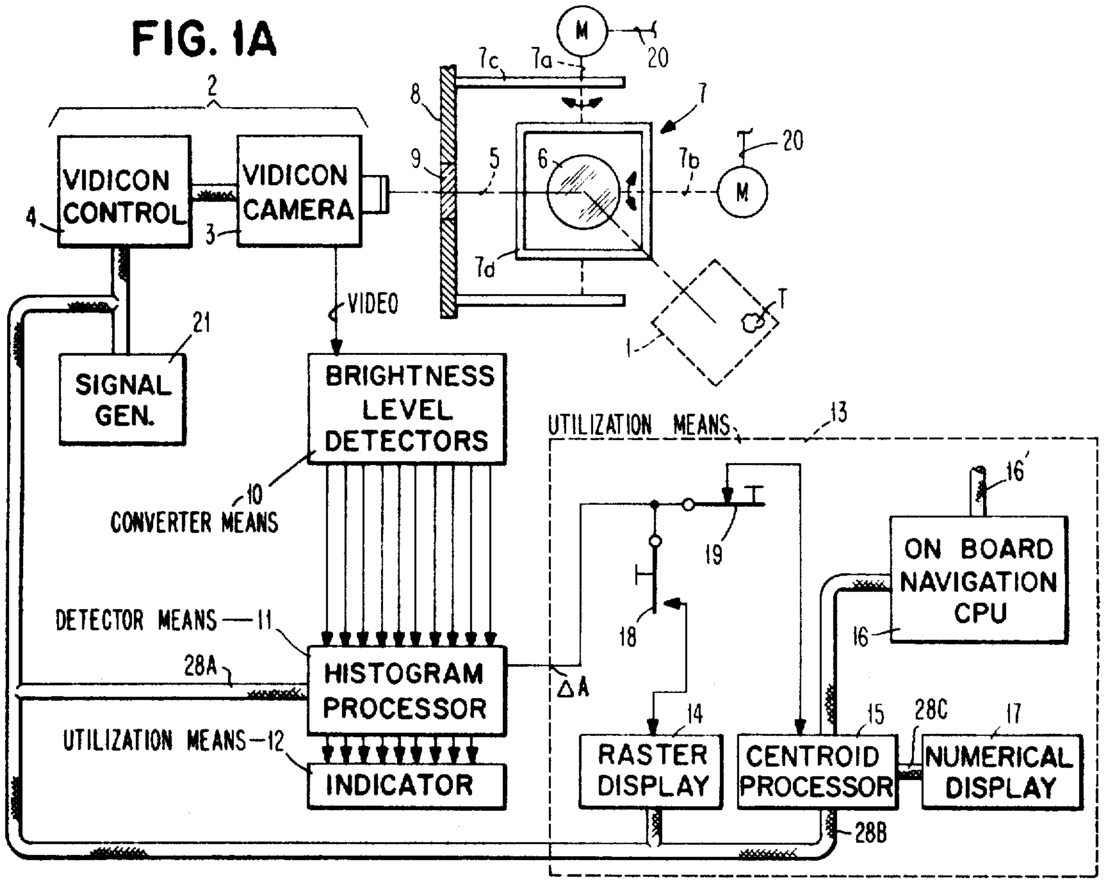
FIG. 1A is a simplified block diagram of the preferred embodiments of the data processing system, brightness level discriminator apparatus, and autonomous navigational system of the present invention.

Briefly, in FIG. 1A, there is shown schematically in block form converter means and detection means of the preferred embodiment of the data processing system of the present invention. The converter and detection means are designated in FIG. 1A by the reference numbers 10 and 11, respectively, and the legends CONVERTER MEANS and DETECTOR MEANS, respectively. An input data signal, which represents a function having a variable parameter, is applied to the input of converter means 10. Converter means 10 quantizes the input signal into three or more signals proportional to the frequency distribution of different preselected values of the parameter. By way of example, as shown in FIG. 1A the data input signal is designated therein as signal VIDEO, and is quantized by means 10 into ten quantization channels which correspond to ten mutually exclusive different values respectively, of the variable parameter. The converted signals are applied to means 11 via the appropriate ten arrowed schematically illustrated conductors shown in FIG. 1A. In response to the converted signals, detection means 11 detects whether at least one of the converted signals associated with an intermediate one of the aforementioned preselected values has a frequency of occurrence less than the respective frequencies of the converted signals associated with the values that are adjacent to the intermediate one. The detected information is utilized by one or more utilization means, such as utilization means 12 and/or 13.

Figure 1B:
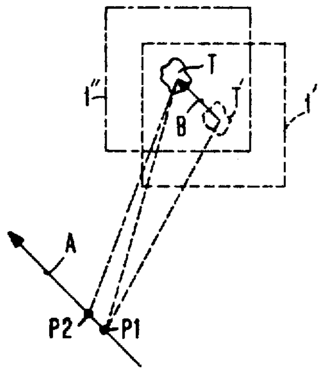
FIG. 1B is a vector diagram illustrating by way of example the movement of a spacecraft with respect to the field of view shown in FIG. 1A.
Figure 1C:
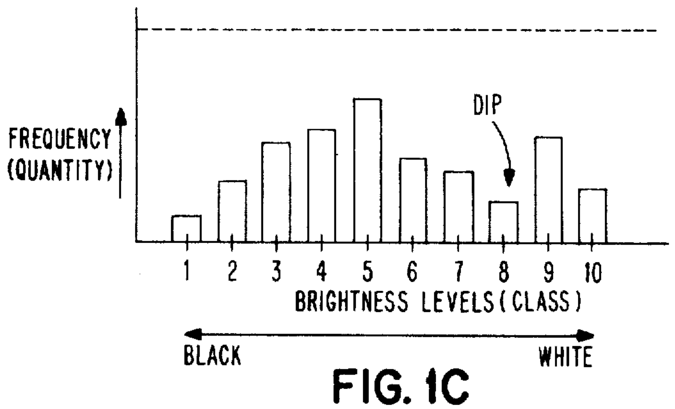
FIG. 1C is a waveform diagram of an illustrative histogram example used to describe the operation of the embodiments of FIG. 1A.

For example, it is assumed for purposes of explanation that the input data signal VIDEO of FIG. 1A when converted by means 10 provides ten converted signals having a frequency distribution represented by the histogram shown in FIG. 1C. For this particular example, means 11 in response to the converted signals detects the presence of the converted signal associated with the intermediate value CLASS 8 which has a frequency of occurrence lower than the respective frequencies of the converted signals associated with the other values CLASSES 7 and 9 adjacent thereto. Thus, converter means 10 sorts the input data samples into data classes. When the converted data is processed by detection means 11, hereinafter sometimes referred to as a histogram data processor or simply histogram processor, the latter's detection capability determines if the histogram data has an aforedescribed dip characteristic DIP. As explained in greater detail hereinafter, in the preferred embodiment the detection means or processor 11 not only has this DIP characteristic detection capability, but also detects, i.e. identifies or determines the location of, the particular intermediate class which is associated with the particular DIP. In FIG. 1C the DIP characteristic is shown as being associated with the intermediate value CLASS 8 for purpose of explanation only. It should be understood, however, that depending on the frequency of occurrence distribution of the particular histogram data being processed, the DIP can be associated with any of the intermediate-value CLASSES 2 to 9, respectively, of the histogram data, it being understood that CLASSES 1 and 10 are the terminal or end values thereof.

The preferred data processor embodiment of the present invention and its implementation will now be described herein in conjunction with the preferred brightness level discriminator apparatus and/or autonomous navigational system embodiments of the present invention. The autonomous navigational system is described herein as being utilized aboard a spacecraft which is orbiting or which is otherwise travelling a prescribed path with respect to a celestial body, e.g. the earth, which has known topographical features that are used as navigational landmarks or other type benchmarks in the system.

Accordingly, as shown in FIG. 1A, the image of a field 1 of view is focussed on the camera target, not shown, of a television transmission system 2 which is internally mounted on board the spacecraft, not shown. The field 1 encompasses a region of the celestial body over which the spacecraft is traveling. For purposes of description, it is assumed that the spacecraft, which may be either of the manned or unmanned types, is orbiting the earth. The particular field 1 includes a known landmark T, such as an island, having known latitude and longitude coordinates.

Television transmission system 2 includes a television camera 3, such as a vidicon type, and its associated control circuitry 4, both of which are well known in the art. The optical axis 5 of camera 3 is aligned with a pointing mirror 6. The latter is mounted in a gimbal assembly 7 that is affixed externally to the spacecraft's bulkhead or wall 8, partially shown and illustrated in cross-section. A transparent window 9 is provided in wall 8 for optically linking the internally located camera 3 to the externally mounted mirror 6. A pair of servo motors M, position the mirror 6 about the respective gimbal axes 7*a* and 7*b*. The motors M are mounted to the respective gimbal frames 7*c* and 7*d* by suitable mounting means, not shown.

Information or data in the form of an analog electrical signal is obtained from signal source 2. In the particular embodiments being described, the analog signal is derived from the signal VIDEO generated by vidicon camera 3 as the camera beam scans the optical image of field 1 focused on the camera's target. Camera 3 preferably utilizes a sequential line scan pattern of, for example, 10 frames per second and 500 lines per frame. As is well known to those skilled in the art, the amplitude of the signal VIDEO is thus modulated by the brightness level pattern or distribution of the image of and hence the field 1. In the preferred apparatus and system embodiments, converter means 10 is implemented by plural brightness level detector channels shown in greater detail in FIG. 2. For the given example of ten converted signals, ten detector channels are provided, each of which is adapted to detect for a different one of ten preselected quantized amplitude levels of the signal VIDEO and consequently their corresponding brightness levels. The frequency distribution of the variable parameter, to wit: the amplitude, of the signal VIDEO is thus converted into a histogram form represented by the ten converted signals.

The implementation of the histogram processor 11 in the preferred apparatus and system embodiments is described in greater detail hereinafter with reference to FIGS. 2–5. Briefly, however, processor 11 senses the information from converter 10 and analyzes it for the presence of a DIP characteristic. It provides various output signals DDLP and LP2 to LP9 which indicate if a DIP characteristic in the histogram data is present and the particular intermediate class, i.e. brightness level, with which the DIP is associated. In the preferred embodiments, it also provides another output signal Δ A utilized by means 13.

Utilization means 12 is implemented in the preferred embodiments as a lamp indicator display system, which is responsive to the aforementioned output signals DDLP, LP2 to LP9. Other types of indicator systems, such as rf signal indicator system types may also be employed particularly where the means 12 is utilized in an unmanned spacecraft.

In the preferred apparatus and system embodiments, the other utilization means 13 includes a raster type display system 14 having a television picture tube or CRT, not shown, therein. It also includes a centroid processor 15, hereinafter described, which determines the centroids of the target T with respect to the X and Y raster coordinates of camera 3. The information from processor 15 is fed to an on board navigation computer, i.e. CPU 16. The latter is programmed to compare the centroid information data from processor 15 with a priori reference data which concerns the particular navigation target T and which reference data is stored in the CPU's memory, not shown. CPU 16 provides in turn output data signals on approprpiate conductors of multiconductor cable 16' which can be used to detect the position of the spacecraft with regard to the landmark target T and/or generate servo type signals therefrom for adjusting the course of the spacecraft, if required. The centroid data of processor 15 may also be displayed in a numerical indicator display 17 which provides numerical type display readouts of the centroid coordinates Xc and Yc of landmark T. By judiciously selecting the positions of the switches 18 and 19, the raster display system 14 and centroid processor 15 may be operated simultaneously and/or independently with respect to each other and/or simultaneously and/or independently with indicator system 12. A signal generator 21 provides various control signals for controlling and synchronizing the vidicon system 2, histogram processor 11 and utilization means 13. In the case of an unmanned spacecraft, the visual display systems 12, 14 and 17 may alternatively be located in a land base tracking center for monitoring purposes. In such a case, the information and/or control signals would be relayed between the spacecraft and center by an appropriate data communication link such as an rf system type, for example. Before describing the detailed implementation of the schematic blocks of FIG. 1A, the preferred mode of operation of the system embodiment of FIG. 1A will now be briefly described.

Referring now to FIG. 1B, the arrow A indicates the path and direction of flight of the spacecraft with respect to the target T at some point of time in its orbital flight. At point P1 of the flight path, it is assumed for purposes of explanation, that the autonomous navigation system of FIG. 1A is ready to acquire a new landmark target T for obtaining positional information of the spacecraft. Accordingly, the CPU 16 is programmed so that it provides appropriate servo signals via conductors 20 which may be part of cable 16', c.f. FIG. 1A. These servo signals drive servo motors M causing the mirror 6 to be pointed in the direction which will allow camera 3 to acquire the field of view which includes the desired new target T. The actual position of the target T is indicated in solid outline form in FIG. 1B. At position P1, it is assumed for sake of explanation that, because of some errors in the navigation data, the CPU is generating servo signals which erroneously drive the gimbal servo motors M. Such, for example, might be the case if the CPU 16 receives erroneous information signals from the attitude sensors not shown, of the spacecraft's inertial guidance system, not shown. As a consequence, the mirror 6, FIG. 1A, is pointed in an offset direction from target T as indicated by the arrow B, FIG. 1B, and the target appears to be in the position indicated by the dash line outline T'.

At some appropriate time after the mirror 6 has been pointed, and the image of field 1' acquired on the vidicon target, the latter is scanned by the beam of camera 3 using the aforementioned raster sequential line scan pattern. The resultant signal VIDEO is applied to the detector channels 10 and converted into one or more of the aforementioned ten data signals during scanning depending upon the brightness level distribution of the field of view. During the frame retrace time, when the beam of camera 3 is blanked, processor 11 will detect the presence of a DIP characteristic in the histogram data due to the presence of the target T in the field 1', FIG. 1A, if it has not already been detected thereby during the frame generation period. Accordingly, processor 11 will provide a signal DDLP which represents the presence of a DIP characteristic and illuminates an appropriate lamp in the indicator display system 12 as well as the appropriate lamp therein which represents the particular brightness level with which the DIP is associated. It should be understood, that in the present invention, brightness levels below the particular level associated with the DIP characteristic are derived mainly from the background of the field, whereas those above are derived mainly from the target T. In other words, the histogram data has a multi-modal distribution derived from data sub-sets associated with the brightness levels of the background and target, respectively. Moreover, even if the DIP characteristic for the same field of view should shift because, for example, of an overall or partial diminuation of the brightness level pattern due to, for example, the presence of atmospheric haze or the like, the processor 11 still detects the presence of the DIP and hence the target T in the field.

At the commencement of the scanning associated with the next frame, detector channels 10 begin to accumulate a new set of histogram data. Signal generator 21 also provides synchronizing signals that synchronize the raster pattern of camera 3 with the raster pattern of system 14, the latter coacting with system 2 as a closed circuit television system when used in a manned spacecraft. During the second frame generation period, since a DIP characteristic was detected in the previous frame the processor 11 in coaction with the signals being derived from channel 10 and a signal derived from the DIP detected characteristic and its associated intermediate class, i.e. brightness level, from the previous frame, provide the output signal Δ A each time the brightness level of the vidicon target image of the field is at or above the particular brightness level associated with the DIP characteristic detected from the previous frame. Signal Δ A is used to control the blanking system of the display of system 14 of means 13. As a result, the image of the target is displayed in a silhouette-like manner on the display screen of system 14 during the second scanning operation of camera 3.

Also during the scanning associated with the second frame of camera 3, if the processor 15 of means 13 is utilized, signal Δ A is used to compute the centroid coordinates of the target T with respect to the X and Y raster coordinates of camera 3. Accordingly, during the second frame scanning operation, the data for computing the centroids is accumulated by processor 15. At the end of the second frame generation period and during its associated frame retrace period, the centroid coordinates Xc and Yc are computed by processor 15 and the resultant data fed to the CPU 16 for the aforementioned comparison. If a discrepancy is detected by the CPU 16 it provides error correction signals which adjust the pointing angle of the mirror and/or makes adjustment of the ships's attitude. Thus, beginning with the second and each subsequent frames associated with camera 3, not only is the brightness level histogram data being updated and/or refreshed, but also the mirror pointing data and/or centroid data of targwt T as the spacecraft moves along its orbital path to new positions such as point P2.

A more detailed description of the schematic blocks of FIG. 1A and their operation will now be described under appropriate headings.

CONVERTER 10

Figure 2:
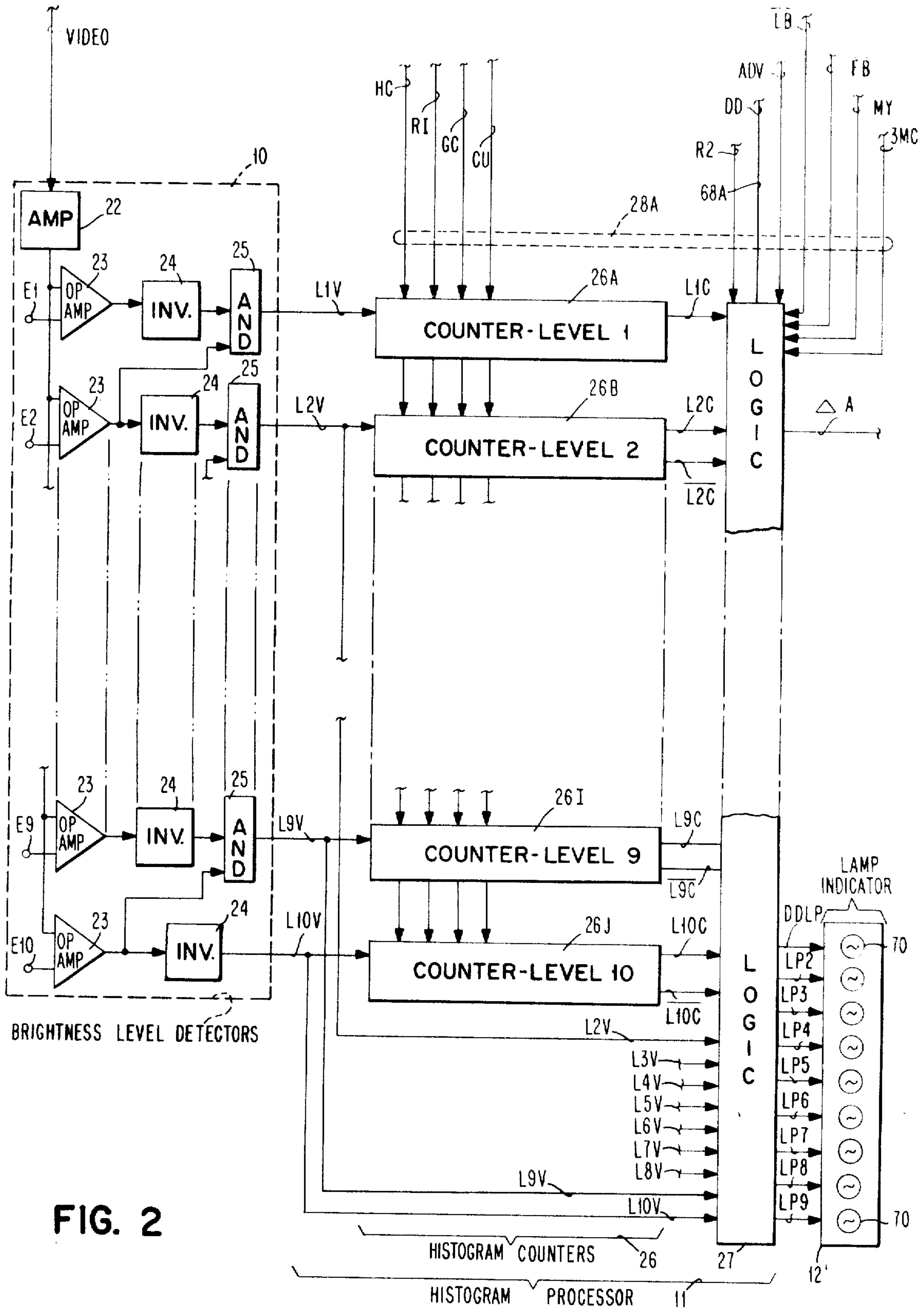
FIG. 2 is a detailed block diagram of the BRIGHTNESS LEVEL DETECTORS and HISTOGRAM PROCESSOR shown in FIG. 1A.

Referring now to FIG. 2, converter means 10 is illustrated as having ten brightness level detector channels commonly connected to a video amplifier 22. Each channel includes an operational amplifier 23 and inverter 24. With the exception of the last channel, each channel also includes a two-input AND gate 25. Only the first, second, ninth and tenth channels are shown in FIG. 2, the others being omitted for sake of clarity. Signal VIDEO is applied to the input of amplifier 22, the output of which is commonly connected to the inverting inputs of the amplifiers 23. To the individual non-inverting inputs of the amplifiers 23 are applied different preselected voltage levels E1 to E10, where E1<E2<E3 . . . <E9<E10. Levels E1 to E10 correspond to preselected different brightness levels which are desired to be investigated and which are judiciously selected to be within the expected range of brightness levels to be encountered by the system.

In order to quantize the VIDEO signal information, the channels 10 are arranged so that the output of the operational amplifier 23 of a succeeding channel is connected to an input of the AND gate 25 of the preceding channel. As a result, if the amplified level of the signal VIDEO is at level E1 or greater but less than level E2, an output signal L1V is exclusively provided by the first channel of means 10. If the amplified level of signal VIDEO is at level E2 or greater but less than E3, an output signal L2V is exclusively provided by the second channel; etc. The tenth channel exclusively provides an output signal L10V whenever the amplified VIDEO signal level is at or above level E10. If the amplified VIDEO signal level is below level E1, no output signals are provided.

For example, let it be assumed for purposes of explanation that, for a given instant of time during the camera scanning operation, the level of the amplified signal VIDEO is between the reference levels E2 and E3. Under these circumstances, the operational amplifiers 23 of the first and second channels provide output signals which are in their respective 0 or DOWN levels. This results from the reference signals E1 and E2, which are applied to the non-inverting inputs of the particular amplifiers 23, being less than the assumed level of the amplified signal VIDEO. Each of the output signals of the amplifiers 23 of the third and subsequent channels on the other hand is at its respective UP level. The first channel inverter 24 causes the output signal of the associated amplifier 23 to be inverted to an UP or 1 level. However, the 0 level of the output signal from the second channel amplifier 23 inhibits the first channel AND gate 25. As a consequence, the output signal L1V is in a DOWN level, i.e. the first channel provides a binary zero or DOWN output signal.

The second channel inverter 24 inverts the DOWN level signal of its associated amplifier 23 to an UP level. The second channel AND gate 25 detects the coincidence of the UP levels of the output signals of the second channel inverter 24 and the third channel amplifier 23, not shown, and places the output signal L2V in an UP or binary one level. The third and subsequent channels' inverters 24 invert the UP levels of the output signals of their respective associated amplifiers 23 to DOWN levels. As a consequence, the AND gates 25 of the third to ninth channels are inhibited, and their respective output signals L3V to L9V are thus in DOWN levels. The tenth, i.e. last, channel inverter 24 provides the output signal L10V directly in its DOWN level. Accordingly, for the assumed example, the second detector channel exclusively provides an output signal L2V with an UP level, and all the other channels provide output signals L1V, L3V–L10V with DOWN levels.

Thus, means 10 can provide ten discrete output analog signals which correspond to the ten preselected and quantized brightness levels. Since the total time duration of each converted signal L1V to L10V is dependent upon the amount of time the amplified VIDEO signal is at a particular quantized level, it consequently is proportional to the frequency of occurrence of the particular quantized level with which it is associated, and hence converter 10 converts the signal VIDEO into an analog histogram form.

During the line retrace and frame retrace periods associated with camera 3, the electron beam is blanked in a manner well known to those skilled in the art. As a consequence, the outputs of the ten channels of converter means 10 are in their respective DOWN levels.

DETECTOR 11

Referring again to FIG. 2, there is shown therein the detector means and more specifically the histogram processor 11 in more detailed block form. It includes ten counters 26, designated by the legends COUNTER-LEVEL 1, COUNTER-LEVEL 2 . . . COUNTER-LEVEL 10 and reference characters 26A–26J, respectively. Only counters 26A, 26B, 26I, and 26J are shown in FIG. 2, the others being omitted for sake of clarity. The outputs of channels 10 are periodically sampled simultaneously as the camera 3 is scanning the image of field 1 and the sampled data of signals L1V to L10V are recorded in counters 26A to 26J, respectively. The resultant output signals of the counters are processed by logic 27 for the detection of an aforementioned dip characteristic, if present, and/or intermediate class associated with the dip characteristic. To accomplish this, logic 27 detects the overflows in the respective counters. The counters may overflow during the frame generation period as a result of the sampling operation, or they are forced to overflow as the result of a count-up operation which takes place during the subsequent frame retrace period. For this purpose, logic 27 processes the counters' output signals L1C– L10C and the counters' NOT output signals $\overline{L2C}$–$\overline{L10C}$. Logic 27 in coaction with these counters' output signals and the signals L2V–L10V of converter means 10 provide the signal Δ A. The histogram processor 11 is under the congrol of various signals HC, R1, GC, CU, R2, ADV, $\overline{LB}$, $\overline{FB}$, MY, and 3MC which are provided by the signal generator 21 via appropriate conductors of a multi-conductor cable 28A. The logic circuitry 27 provides the output signal DD which is fed back via a conductor 68A of cable 28A to the signal generator 21. Logic circuitry 27 also provides a set of output signals DDLP, LP2–LP9 for driving the individual indicator lamps 70 of the lamp bank 12', which is part of system 12, c.f. FIG. 1.

Figure 3:
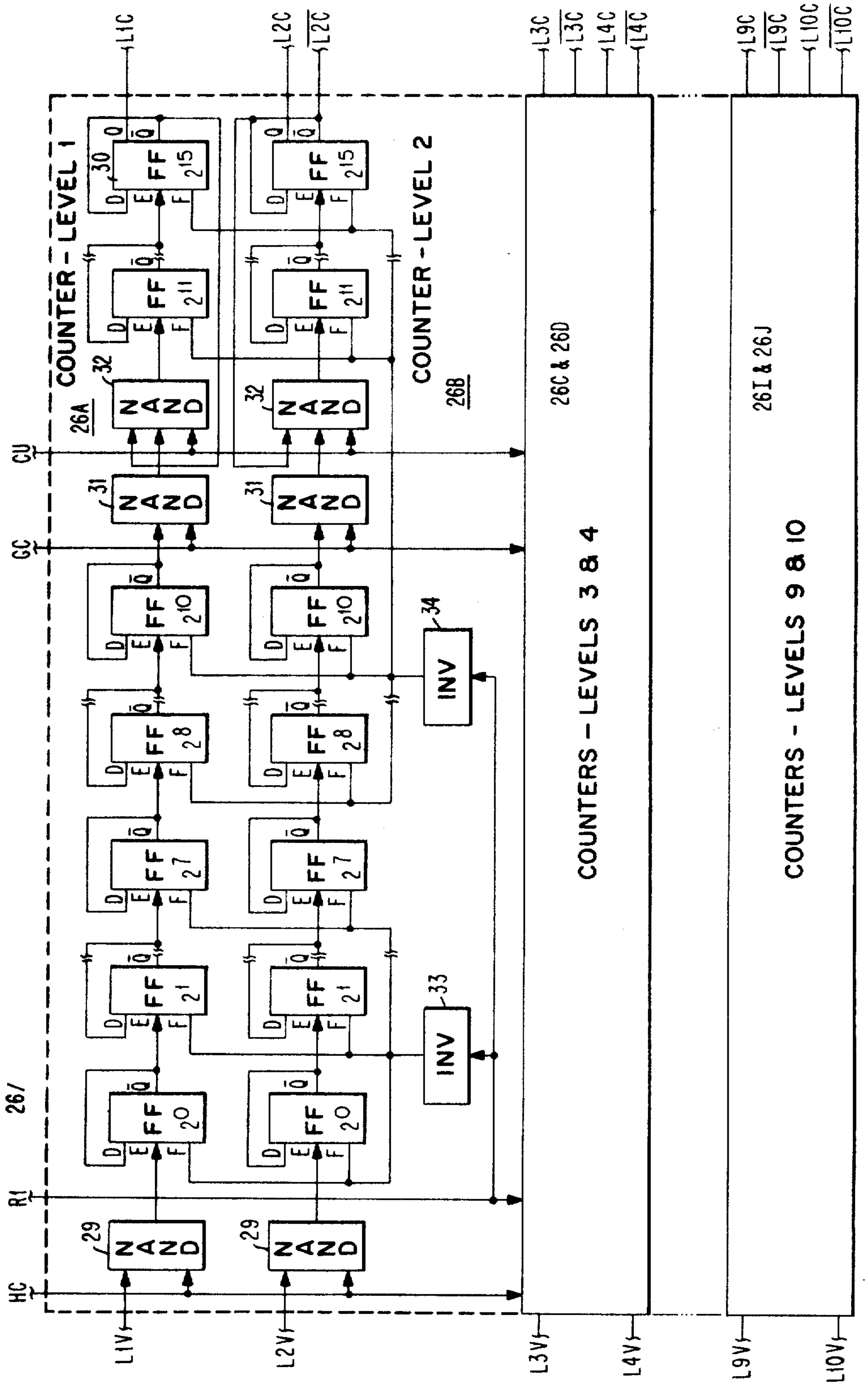
FIG. 3 is a detailed block diagram of the COUNTERS shown in FIG. 2.

Referring now to FIG. 3, the histogram counters 26 are shown therein in greater detail. More particularly, for sake of clarity, only the first two counters 26A and 26B are shown in detail, the third, fourth, ninth and tenth counters 26C, 26D, 26I, and 26J are illustrated in block form, and the others omitted. Each counter includes a NAND gate 29 and sixteen serially-connected counter stages designated by the reference characters FF and their respective binary weights $2^0$ to $2^{15}$. Each stage thus represents one of the sixteen binary bits $2^0$ to $2^{15}$, respectively, such as for example, the $2^{15}$ stage 30 of counter 26A.

Any suitable circuit may be utilized to implement the stages of counters 26. One known circuit found suitable for this purpose is a monolithic circuit type referred to by the manufacturer, Texas Instruments as an SN5474. In this circuit two, delay-element type edge-triggered flip-flops are packaged on a single substrate. Each flip-flop includes inter alia three inputs and two outputs designated by the manufacturer as D, clock and clear inputs and two complementary outputs designated Q and $\overline{Q}$. The D input is generally utilized as a data input. For sake of clarity, the D, clock and clear inputs of the flips-flops of FIG. 3 are designated by the reference characters D, E, and F, respectively. The manufacturer's designated Q and $\overline{Q}$, i.e. true and false, respectively, complementary outputs of the flip-flops are designated with the same reference characters Q and $\overline{Q}$, respectively, in FIG. 3, c.f. stage 30.

As utilized herein, the output of the input NAND gate 29 of each of the counters 26 is connected to the clock input E of the $2^0$, i.e. lowest order, stage of the particular counter. The false or $\overline{Q}$ output of each stage is connected, i.e. fedback, to its own D input. The $\overline{Q}$ output, if followed by a succeeding higher order stage, is also connected to the clock input E of the particular succeeding stage. For sake of clarity in FIG. 3 stages $2^2$ to $2^8$, $2^9$ and $2^{12}$ to $2^{14}$ of counters 26A and 26B have been omitted. The interconnection between stages of each counter is either directly as is the case between stages $2^0$ to $2^9$, $2^{11}$ to $2^{14}$, and their respective succeeding stages, or indirectly as is the case between tages $2^{10}$ and $2^{11}$. More specifically, in each counter between the $2^{10}$ stage and $2^{11}$ stage there is provided a pair of serially connected NAND gates 31 and 32. NAND gate 31 NANDs the output signal of the $2^{10}$ stage of its associated counter with the signal GC. NAND gate 32 NANDs the output signal of the particular NAND gate 31 of its associated counter with the signal CU and the signal at the output $\overline{Q}$ of the last stage $2^{15}$ of its associated counter. The output of a NAND gate 32 is connected to the input E of the $2^{11}$ stage of its associated counter.

The stages $2^0$–$2^{15}$ of each counter are reset by a signal derived from the reset signal R1. More particularly, as shown in FIG. 3 the signal R1 is inverted by the pair of inverters 33 aNd 34 which are connected to the clear inputs F of the $2^0$–$2^8$ stages and $2^8$–$2^{15}$ stages, respectively of the pair of counters 26A, 26B. In this manner each of the inverters 33, 34 drives an equal number of stages and provides for ease in circuit packaging when the aforesaid stages are of the integrated circuit type. It should be understood that the other eight counters 26C–26J are also arranged in similarly configured pairs, as the pair of counters 26A and 26B, i.e. counter pair 26C and 26D, counter pair 26E and 26F, etc., and each such counter pair has a pair of inverters corresponding to the inverters 33, 34. Signals L1C to L10C are provided at the true outputs Q of the $2^{15}$ stages of counters 26A to 26J, respectively. Signals $\overline{L2C}$ to $\overline{L10C}$ are provided at the false complementary outputs $\overline{Q}$ of the $2^{15}$ stages of counters 26B to 26J, respectively.

For the particular configuration shown in FIG. 3 in which the complementary output $\overline{Q}$ is fed back to its data input D, each time the input signal applied to the clock input E of a flip-flop stage of a counter of FIG. 3 goes from a DOWN to an UP level, the state of the particular flip-flop changes. Moreover, each time an input signal applied to the clear input F of a flip-flop stage goes from an UP to a DOWN level, it clears the particular stage and as a result the outputs Q and $\overline{Q}$ are at DOWN and UP levels, respectively.

Moreover, whenever a counter overflows, it latches the output of the particular counter as a result of the DOWN level at the output $\overline{Q}$ of the counter's last stage $2^{15}$ which inhibits the counter's associated NAND gate to which it is applied.

Figure 4:
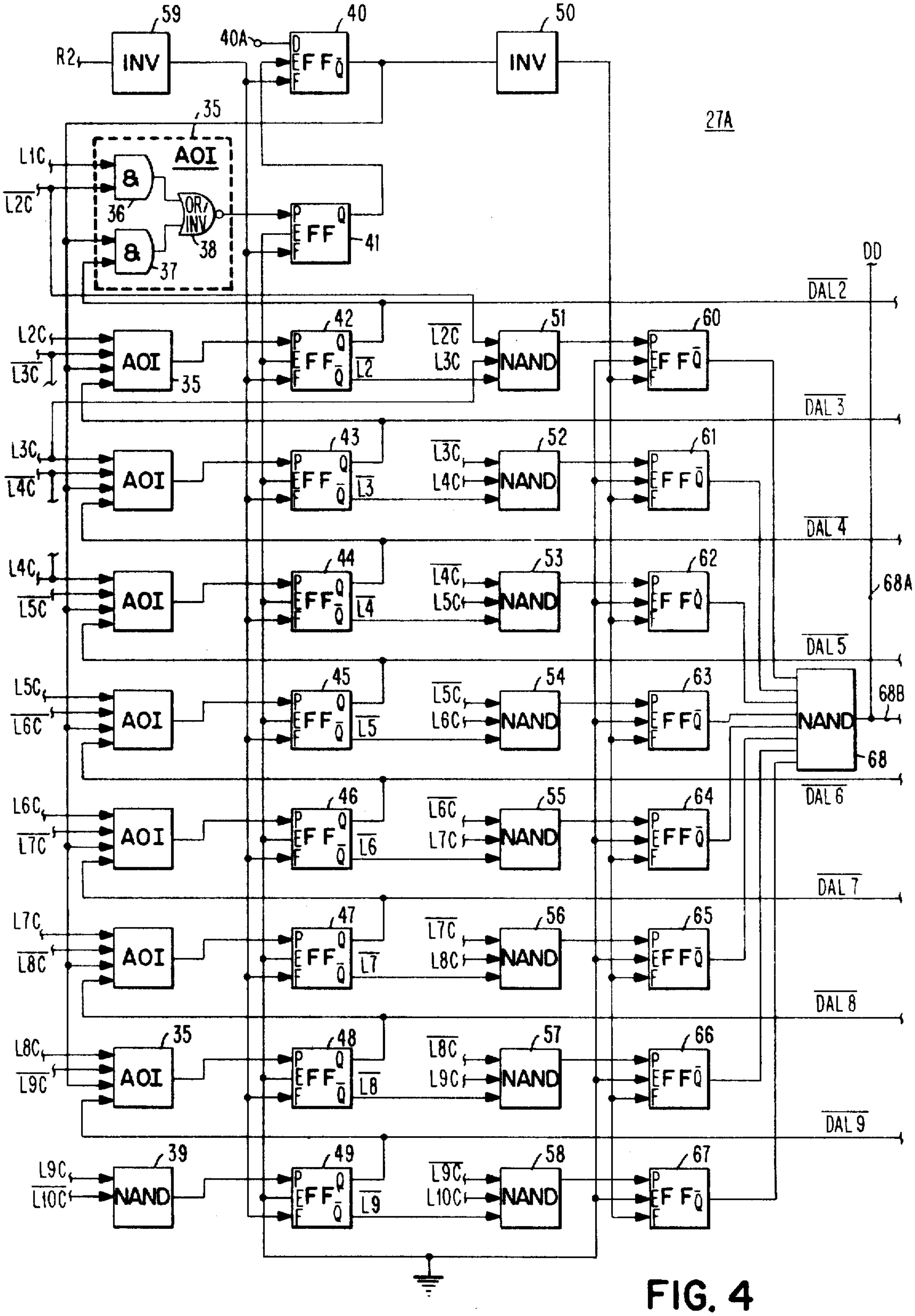
FIG. 4 is a detailed block diagram of a portion of the LOGIC shown in FIG. 2.
Figure 5:
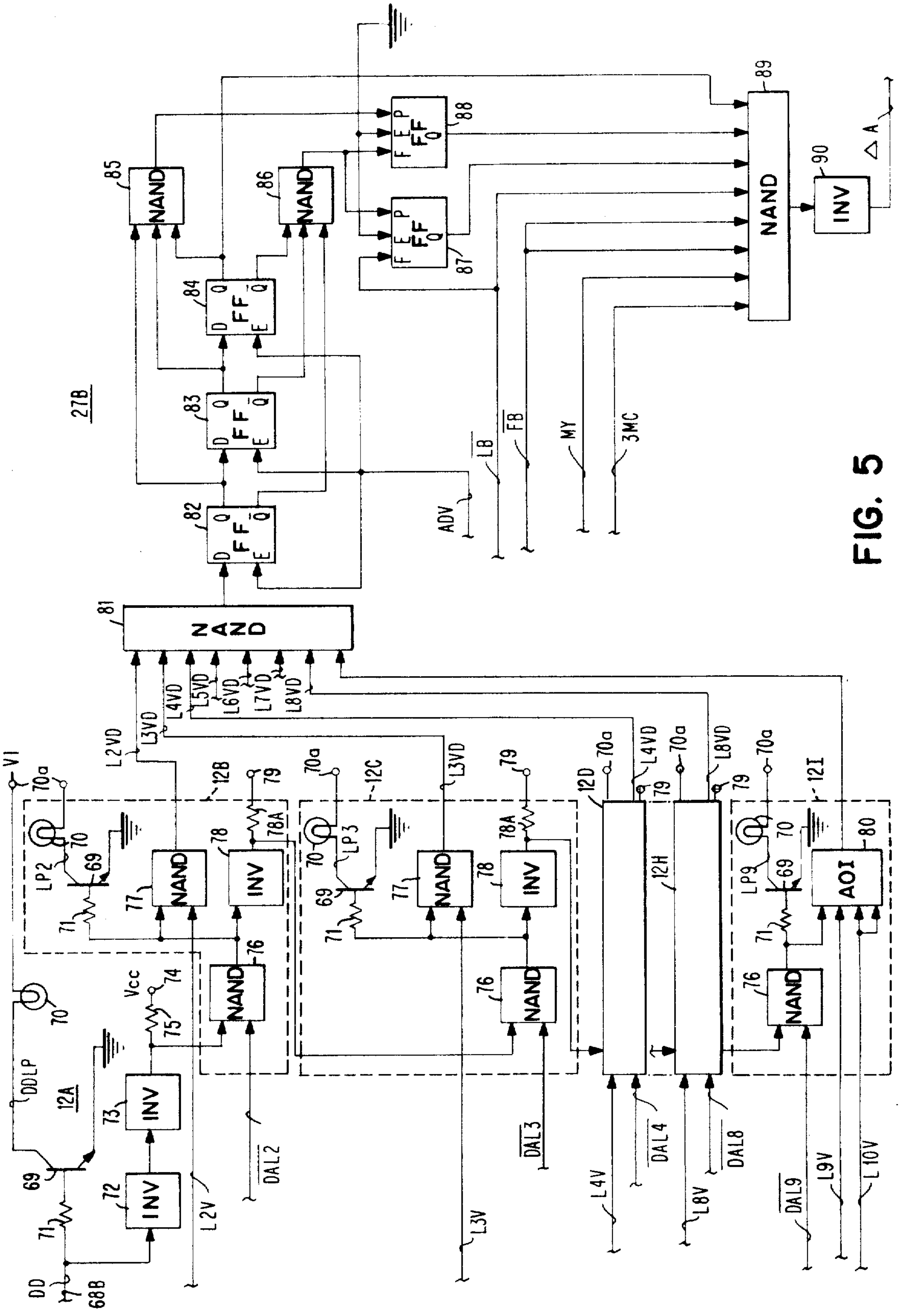
FIG. 5 is a detailed block diagram illustrating the remainder of the LOGIC shown in FIG. 2 and the INDICATOR apparatus shown in FIG. 1.

Referring now to FIGS. 4–5, there is shown therein the preferred embodiment of the logic circuit 27 of FIG. 2. For sake of convenience, that portion of the logic circuit 27 of FIG. 2 illustrated in FIG. 4 is designated by the reference character 27A and the remainder shown in FIG. 5 is designated by the reference character 27B. Also in FIG. 5, for sake of clarity the lamp driver circuits for the lamps 70 of bank 12', FIG. 2, are shown as being included in the logic circuits 12A to 12I.

As shown in FIG. 4, logic 27A includes a row of eight identical AND/OR/INVERTER circuits 35 designated by the legends AOI. Only the first AOI circuit is shown therein in detail for sake of clarity. Accordingly, each AOI circuit 35 includes a pair of two-input AND gates, e.g. gates 36 and 37, the outputs of which are Ored by the OR gate of a series-connected OR/INVERTER combination circuit thereof, e.g. circuit 38. One of the AND gates in each of the AOI circuits Ands the signal at the true output $\overline{Q}$ of the last stage $2^{15}$ of an exclusive one of the first eight counters 26A to 26H of FIG. 3 with the NOT output signal at the false output Q of the last stage $2^{15}$ of the succeeding counter. Thus, for example, the AND gate 36 of the first AOI circuit 35 Ands true signal L1C of stage 30 of counter 26A with NOT signal $\overline{L2C}$ of the last stage $2^{15}$ of succeeding counter 26B; the corresponding AND gate, not shown, of the second AOI circuit 35 Ands signals L2C and $\overline{L3C}$ of the last stages of counters 26B and 26C, respectively, etc. In addition, a NAND gate 39 Nands signals L9C and $\overline{L10C}$ of the last stages of counters 26I and 26J, respectively.

One of the inputs of the other AND gate, e.g. gate 37, of each AOI circuit 35 is connected to the false output $\overline{Q}$ of flip-flop circuit 40, which is also preferably of the aforementioned SN5474 type. The outputs of the eight AOI circuits 35 and the NAND gate 39 are connected to the respective inputs P of the flip-flop circuits 41 to 49, respectively. Circuits 41 to 49 are also preferably of the SN5474 type, the input P corresponding to another input thereof designated preset by the manufacturer. The true output Q of flip-flop 41 is connected to the clock input E of flip-flop 40. The true or 1 output Q of each succeeding flip-flop, i.e. flip-flops 42 to 49, is connected to the other input of the AND gate, which corresponds to AND gate 37, of the particular AOI circuit 35 which is connected to the input P of the preceding one of the flip-flops 41 to 48. Thus, the output Q of flip-flop 42 is connected to an input of gate 37 of the first AOI circuit 35; the output Q of flip-flop 43 is connected to an input of the corresponding gate, not shown, of the second AOI circuit 35; and so forth. The output Q of flip-flops 42–49 are also connected to circuits 2B to 12I, respectively, of FIG. 5 and provide thereat signals designated $\overline{DAL2}$ to $\overline{DAL9}$, respectively.

The output $\overline{Q}$ of flip-flop 40 is also connected to the input of an inverter circuit 50. Signals $\overline{L2}$ to $\overline{L9}$ are provided at the outputs $\overline{Q}$ of flip-flops 42–49, respectively. The outputs $\overline{Q}$ of circuits 42 to 49 are connected to one of three inputs of NAND gates 51 to 58, respectively. NAND gates 51–58 Nand signals $\overline{L2}$ to $\overline{L9}$, respectively, with signals $\overline{L2C}$ to $\overline{L9C}$, respectively, of counters 26B–26I and signals L3C to L10C, respectively, of counters 26C–26J. Reset signal R2 is applied via inverter 59 commonly to the clear inputs F of flip-flops 40–49. The outputs of gates 51 to 58 are connected to the preset inputs P of flip-flops 60 to 67, respectively, which are also preferably of the SN5474 type. The clear inputs F of flip-flops 60 to 67 are commonly connected to the output of inverter 50. The clock inputs E of flip-flops 41–49 and 60–67 are commonly grounded as shown in FIG. 4. NAND gate 68 Nands the outputs $\overline{Q}$ of flip-flops 60 to 67 and at its output provides the signal DD which is fed back to the signal generator 21 via conductor 68A, c.f. FIGS. 1A and 2, and is also fed via conductor 68B to logic 27B of FIG. 5, together with the signals $\overline{DAL2}$ to $\overline{DAL9}$ of flip-flops 42–49.

In order to undertand the hereinafter described operation of logic 27, the truth table for each of the flip-flop circuits 41–49 and 60–67 is indicated in Table I, as follows:

TABLE I

| P | F | Q | $\overline{Q}$ | Remarks |
|---|---|---|---|---|
| 0 | 0 | | | Unstable |
| 1 | 0 | 0 | 1 | Clear |
| 1 | 1 | | | No change |
| 0 | 1 | 1 | 0 | Set |

Thus, the concurrent presence of DOWN levels to the inputs P and F provides an unstable condition in the respective outputs Q and $\overline{Q}$. The concurrent presence of UP and DOWN levels to the inputs P and F, respectively, resets, i.e. clears, the flip-flop to a 0 state. Conversely, the concurrent presence of a DOWN and UP level to the inputs P and F, respectively, sets the flip-flop to a 1 state. The concurrent presence of UP levels to the inputs P and F causes no change in the state of the flip-flop, i.e. the flip-flop remains in its previous state.

Turning now to FIG. 5, as aforementioned logic circuits 12A–12I include part of the lamp indicator driver circuitry. For sake of clarity only logic circuits 12A, 12B, 12C and 12I are shown in detail, circuits 12D and 12H are shown in block form, and circuits 12E to 12G are omitted. It should be understood that circuits 12B and 12H are identically configured.

Each lamp indicator driver includes a switching transistor 69 which when switched on provides an output signal, e.g. signals DDLP, LP2 to LP9. The latter signals control the illumination of the indicator lamps 70 which are connected in the respective output circuits of transistors 69. As shown in FIG. 5, transistors 69 are NPN types and have grounded common emitter configurations. An appropriate voltage source V1 is applied to terminals 70a and suitable current-limiting resistors 71 are provided in the base circuit. In circuit 12A, signal DD is applied via conductor 68B to the input, i.e. base, of transistor 69 via resistor 71, and is also applied to the input of the series connected inverters 72, 73. A positive voltage Vcc for the inverters 72, 73 is applied from terminal 74 via resistor 75.

The circuits 12B to 12H, each have a pair of NAND gates 76, 77 and inverter 78, as well as a bias terminal 79 to which is applied a suitable positive voltage for biasing the particular inverter 78 thereof via an associated resistor 78A. The last circuit 12I also includes a NAND gate 76 but in lieu of the NAND gate 77 and inverter 78 of circuits 12B to 12H, circuit 12I employs an AND/OR/INVERTER circuit 80, which is similarly configured as the AOI circuit 35 shown in detail in FIG. 4.

The NAND gates 76 of circuits 12B and 12C to 12I Nand the respective outputs of inverters 73 and 78 or the preceding circuits 12A to 12H, respectively, with the ignals $\overline{DAL2}$ to $\overline{DAL9}$, respectively. Each of the NAND gates 77 of circuits 12B to 12H Nands the signal at the output of the NAND gate 76 of the particular one of the circuits 12B to 12H with which the particular NAND gate 77 is associated and a particular one of the signals L2V to L8V, respectively, form the appropriate one of the detector channels 10, c.f. FIG. 1. One of the AND gates, not shown, of AOI circuit 80 of circuits 12I Ands the output of the NAND gate 76 thereof with the signal L9V from the appropriate detector channel of circuit 10. The inputs of the other AND gate, not shown, of circuit 80 are commonly connected and the signal L10V from the last channel of circuit 10 is applied thereto.

Multiple input NAND gate 81 Nands the outputs of NAND gates 77 of circuits 12B to 12H, respectively, as well as the output of AOI circuit 80 of circuit 12I. The output signals appearing at the outputs of the NAND gates 77 of circuits 12B to 12H are designated by the legends L2VD to L8VD, respectively. The output of NAND gate 81 is connected to the input D of the input stage of a three-stage digital filter shown as flip-flop network 82–84, and which are preferably the aforementioned SN5474 types. Signal ADV from generator 21 is applied to the commonly-connected clock inputs E of these stages. The respective outputs Q of stages 82–84 are Nanded by NAND gate 85, and the respective outputs $\overline{Q}$ are Nanded by NAND gate 86. The output of gate 86 is connected to the preset input P and clear input F of the flip-flops 87 and 88, respectively, which also are preferably of the SN5474 type. Signal $\overline{LB}$ from generator 21 is applied to the clear input F of flip-flop 87. The output of gate 85 is connected to the preset input P of flip-flop 88. The clock inputs E of flip-flops 87, 88 are commonly connected to ground. NAND gate 89 Nands the output signals at the outputs Q of flip-flops 87 and 88 and the signals $\overline{FB}$, MY, and 3MC from generator 21 to provide the output signal ΔA via inverter 90.

The operation of the histogram processor 11 will now be described. It will begin with a discussion of the operation of counters 26. For purposes of explanation, for the given example of five hundred lines per frame, it will be assumed that five hundred samples of the converted data signals LIV to L10V are taken per line. Thus, a matrix of 500 × 500 = 250,000 sample bits of the image of field 1 is taken each frame.

Theoretically, the brightness distribution of the field could be such that all the sampled points thereof are at the same level. If such were the case and the level was in the quantized range associated with converter 10, then only one of the counters 26A to 26J would be advanced each time the sampling pulse actuates the counters. However, as a statistical probability such cases are rare and obviously do not contain the presence of a DIP characteristic. Generally, the distribution will be more spread out and consequently each of the counters 26A to 26J in the preferred embodiment is provided with a more compatible and lesser number of stages, e.g. 16 stages, than otherwise would be required to store the entire number of samples per frame, which for the given example is 250,000 samples/frame.

Figure 3D:
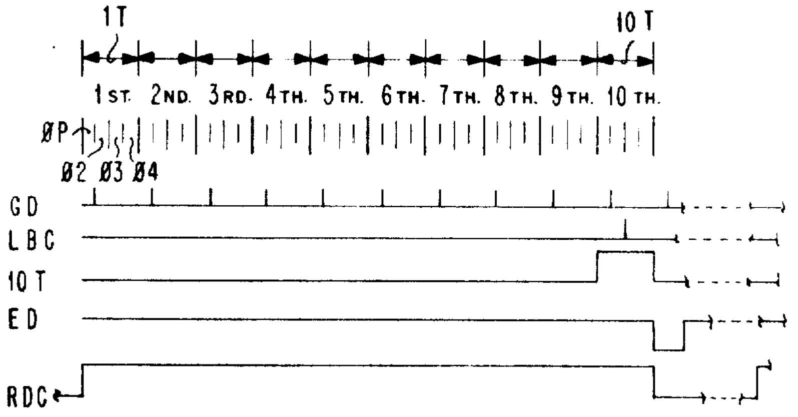
FIGS. 3A–3D are waveforms diagrams of various signals of the embodiments shown in FIG. 1A.
Figure 3A:
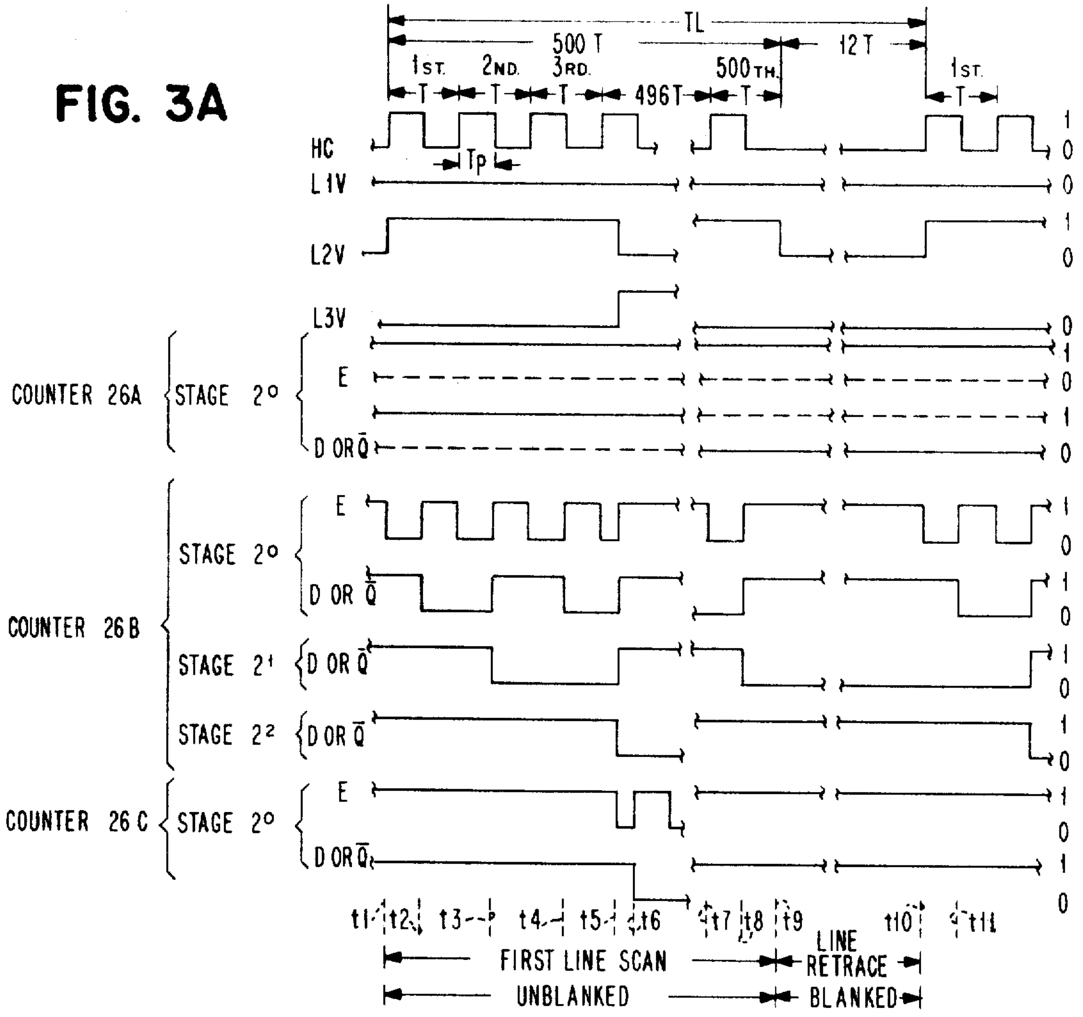
Figure 3B:
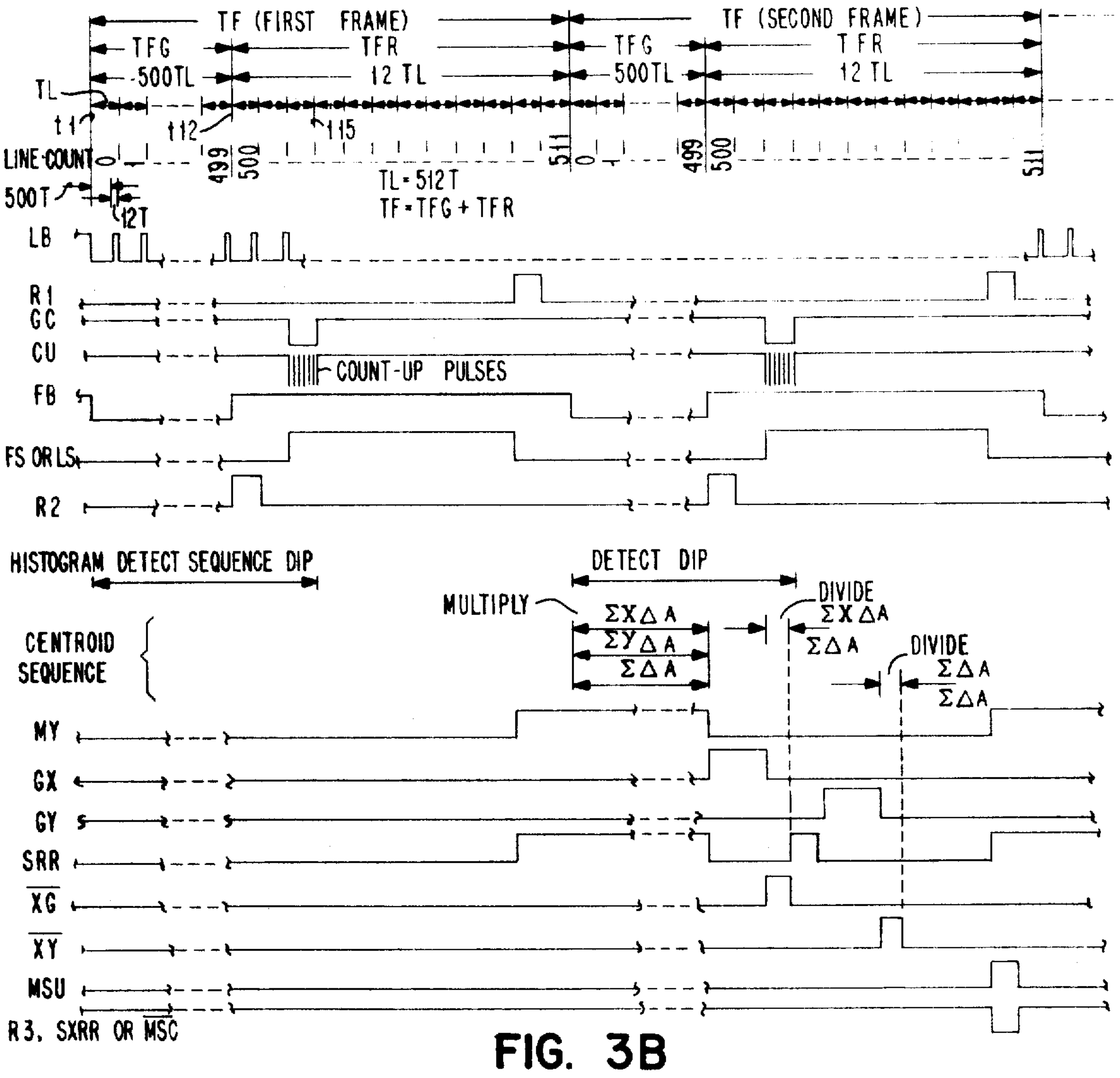

In FIG. 3A, and for purposes of explanation, there are shown by way of example typical waveforms associated with certain stages $2^0$ of counters 26A-26C and stage $2^1$ and $2^2$ of counter 26B during the first line scan of the first frame associated with camera 3. During the turn-on time of the system, i.e. prior to time t1, signals CU and GC, c.f. corresponding waveforms of FIG. 3B, are preconditioned to be in UP levels and signal HC is in a DOWN level. Also, the line blank signal LB and frame blank signal FB are at UP levels. Thereafter and still prior to time *t1*, a reset signal R1 is temporarily placed from a DOWN to an UP level which causes each stage of the counters 26 to be cleared. Signal R1 is then returned to its DOWN level prior to time *t1*. Thus, immediately prior to time *t1*, the output signal levels at the outputs Q are DOWN and the output signal levels at the outputs $\overline{Q}$ are UP for all the stages of counters 26. Also prior to time t1, since the beam of camera 3 is blanked, signals L1V to L10V are in DOWN levels and consequently the outputs of the input NAND gates, e.g. gates 29, are at UP levels, c.f. waveforms L1V-L3V and waveform E of stages $2^0$ of counters 26A–26C shown in FIG. 3A.

At time t1, sampling signal HC is applied to the counters 26 as a pulse train having a pulse cycle T. Signal HC is synchronized with the unblanking of the beam of camera 3 which also occurs at this time when signals LB and FB go to DOWN levels. For purposes of explanation, it is assumed that the brightness level distribution of the field 1 is such that signal L2V goes to an UP level at time t1 to the exclusion of the other signals L1V, L3V to L10V which remains in their respective DOWN levels. As a consequence only the output of NAND gate 29 of channel 26B goes to a DOWN level, c.f. waveform E of FIG. 3A, of stage $2^0$ of counter 26B, at time *t1*. For the aforementioned SN5471 circuit type, however, the signal levels at the outputs Q and $\overline{Q}$ of stage $2^0$ of counter 26B do not change levels at this time.

At time *t2* when the signal HC goes from an UP to a DOWN level, NAND gate 29 of counter 26B goes from an UP to a DOWN level. This causes stage $2^0$ of counter 26B to change state, resulting in the output $\overline{Q}$ of the stage $2^0$ being changed from an UP to a DOWN level. This change in the output $\overline{Q}$ of stage $2^0$ of counter 26B is in a direction which does not change the state of the next stage $2^1$ of counter 26B. The counter 26B has now recorded therein the first sample data bit.

As shown in FIG. 3A, it is assumed that the brightness distribution of field 1 is such that the signal L2V remains exclusively in the UP level during the next two sampling cycles, i.e. 2nd and 3rd cycles, and for part of the 4th cycle. Thus at time *t3*, when signal HC goes from an UP to a DOWN level during the 2nd sampling cycle and the output of NAND gate 29 of counter 26B changes in a complementary manner, the state of stage $2^0$ of counter 26B changes from a binary 1 to a binary 0. The concommitant complementary change in the output $\overline{Q}$ of this stage $2^0$ from a DOWN to an UP level causes the succeeding stage $2^1$ of counter counter 26B to change from a 0 to a 1 state. The resultant change from the UP to the DOWN level of the output $\overline{Q}$ of stage $2^1$, however, does not affect the state of the next stage $2^2$. Thus at time *t3*, counter 26B has stored therein the second sample, its stage $2^1$ being in a 1 state and all its other stages being in 0 states.

As a result of the signal HC going from an UP to DOWN level at time t4 during the 3rd sampling pulse cycle; only the state of stage $2^0$ of counter 26B is changed for the assumed set of input conditions. Thus, the respective binary 1 bits in stages $2^0$ and $2^1$ of counter 26B now record the third sample.

During the next sampling cycle, i.e. the 4th cycle, it is assumed for purposes of explanation that at a time *t*5 prior to the signal HC going from an UP to a DOWN level, the levels of signals L2V and L3V go from an UP to a DOWN condition and a DOWN to an UP condition, respectively, due to the particular brightness level distribution of the field 1 as recorded by the image on the target of camera 3 being scanned. Under these conditions, the output of the input NAND gate 29 of channel 26B goes from a DOWN to an UP level due to the inhibiting action of the 0 or DOWN level of signal L2V. This causes a chain reaction which is apparent to those skilled in the art that changes the states of the stages $2^0$, $2^1$ and $2^2$ of counter 26B to a binary 0, 0, and 1, respectively. Thus, counter 26B now stores the fourth sample.

Also at the time t5, the output of the input NAND gate, not shown, of counter 26C goes from an UP level to a DOWN level when the signal L3V goes from its DOWN to its UP level, signal HC being at an UP level at this time. Consequently, at time t6 when the signal HC goes from its UP to its DOWN level, the state of the first stage $2^0$, not shown, of counter 26C is changed from a binary 0 to a binary 1, and counter 26C also stores the fourth sample therein in its first stage. It should also be understood that counter 26C now contains the first data input sample, i.e. $2^0 = 1$, associated with the third channel of converter 10. At time *t*6, since signal L2V is now in the DOWN level it inhibits the action of NAND gate 29 of counter 26B and consequently counter 26B maintains the binary number, i.e. $2^2 = 4$, stored therein. From a statistical viewpoint, the storing of the fourth sample for the assumed example in two counters is insignificant when compared to the total number of samples taken per frame. For this same reason, the cut-off threshold values between quantization channels of converter 10 need not be critically designed, since the probability that a particular level of the amplified signal of signal VIDEO will occur exactly within any two particular overlapping threshold values of any two adjacent channels of converter 10 is quite remote and/or the result of storing a particular sample in two counters is negligible when compared with the total number of samples.

For sake of explanation, let it be assumed that alternatively signals L2V and L3V had shifted levels during the 3rd sampling cycle when signal HC was in a DOWN level. As a consequence of the inhibiting effect of the DOWN level of signal HC, the output levels of NAND gate 29 of counter 26B, and the corresponding NAND gate of counter 26C remain in their respective UP levels. Under these circumstances, the data in counters 26B and 26C is not changed and correspond to a decimal 3 and 0, respectively. When signal HC goes to an UP level in the 4th sampling cycle, the NAND gate 29 of counter 26B remains inhibited due to the now DOWN level of signal L2V and consequently the data in counter 26B remains the same. However, at the same time, i.e. when signal HC goes from a DOWN to an UP level at the commencement of the 4th sampling cycle, the level of the output signal of the input NAND gate of counter 26C goes from an UP to a DOWN level, so that when signal HC subsequently goes from the UP to the DOWN level in the 4th cycle, it will cause a binary 1 to be placed in stage $2^0$ of counter 26C only. Thus, by judiciously selecting the duration of the pulse width Tp of the sampling signal HC with respect to the sampling cycle period T, the probability of recording the same sample in two counters can be further mitigated, for example by making T*p* less than ½T. It should also be noted that the probability of the transition of the signal levels of two of the signals L1V to L10V occurring when the signal HC is going from an UP to a DOWN level and consequently any error which occurs in such a case in recording the sample in the wrong one or both of the associated counters, or not recording it at all, is again negligible when compared to the total number of samples.

Referring again to FIG. 3A, the pulses of sampling signal HC continue to be applied during the first line scan. At time *t*7, the last sampling cycle of the first line scan which in the given example is the 500th sampling cycle, begins. For purposes of explanation it is assumed that signal L2V is in the UP level and that counter 26B's lower order stages $2^0$, $2^1$, and $2^2$ contain data bits 1, 0, and 0, respectively. At time t8, during the 500th sampling cycle when signal HC goes from an UP to a DOWN level, counter 26B's stages $2^0$ and $2^1$ change, thereby recording the data associated with the 500th sampling pulse of the first line scan.

At time *t*9, the first line retrace period commences. During each line retrace period, signal LB goes to an UP level, c.f. waveform 3B, and the beam of camera 3 is blanked. As a result, converter 10 provides no output signals, i.e. the signals L1V to L10V are placed or maintained as the case might be in their respective DOWN levels. Thus, at time *t*9, signal L2V goes from its UP to a DOWN level, and the rest of the signals L1V, L3V to L10V are maintained in their DOWN levels, c.f. FIG. 3A, waveforms L1V–L3V, for example. This causes the outputs of the input NAND gates, e.g. NAND gates 29, of counters 26A–26J to be placed or maintained in their respective UP levels, c.f., for example, waveform E of stages $2^0$ of counters 26A–26C of FIG. 3A. Signal HC is synchronized with the commencement of each line retrace period, as well as each frame retrace period, to be maintained in its DOWN position for the duration of the particular line or frame retrace period. As a result, the input NAND gates of the counters 26A–26J are also inhibited by the DOWN level of signal HC and their outputs are at UP levels during each entire line and frame retrace period. During the line retrace periods no data is entered into the counters 26A–26J, and each counter remains with the particular information it has stored therein as a result of the sampling associated with the previous line scans of the same frame. In the given example each line retrace period is equivalent to twelve sampling cycles, i.e. 12T.

At time *t*10, the line retrace period associated with the first line scan terminates and the second line scan begins. Again, the beam of camera 3 is unblanked and the sampling signal HC becomes periodic rising to an UP level at time *t*10. For purposes of explanation, it is assumed that converter 10 provides only the output signal L2V in the UP level at time *t*10. As a result, when the signal HC goes to a DOWN level at time *t*11, the information in counter 26B will be advanced one more count.

As is readily apparent, at the end of the five hundredth line scan of a frame, the counters 26A–26J have stored therein binary numbers representative or indicative of the brightness level distribution of the field 1. When the five hundredth line scan and its associated line retrace period terminates, the frame retrace period commences.

The operation of the histogram processor will now be discussed with reference to the waveforms of FIG. 3B. As aforementioned, it is during the frame retrace period that the data stored in the counters 26A–26J is analyzed by logic 27 for the presence of the aforementioned DIP characteristic, if it has not already been detected during the frame generation period. After the analysis has been made and prior to the commencement of the next frame and its associated first line scan, the counters 26A–26J are cleared by the signal R1. It should be understood that also during the frame retrace period the image of the field 1 stored in the target of camera 3 is refreshed, i.e. the old image is removed from and a new image placed on the camera target in a manner well known to those skilled in the art.

Briefly to provide the DIP characteristic analysis, the logic 27 is arranged to detect overflows in counters 26A–26J. The overflows may occur during the frame generation period, as the samples are being taken, or during the frame retrace period. During the frame retrace period an automatic count-up operation is performed in each of the counters 26A to 26J to cause the overflows and preferably the counters are advanced concurrently to expedite the operation. As understood herein, an overflow occurs in a counter 26A–26J when the last stage $2^{15}$ of the particular counter changes from a 0 to a 1 bit, i.e. its output Q goes from a DOWN to an UP level. As the counters are advanced, they overflow in a sequence determined by the information stored in the respective counters. First, the counter overflows which has the largest number stored therein, then the counter storing the next largest number, etc. The overflows are processed by logic 27, which in response thereto determines if a DIP characteristic is present and/or the particular intermediate class which is associated with the DIP characteristic as will now be set forth in greater detail.

The preferred embodiments are utilized to detect a target which has brightness levels which are relatively higher than the field's background, the target having a relatively smaller area than that of the background. Under such circumstances a considerable saving in hardware may be provided based on certain statistical probabilities. One such statistical probability is that a vast majority of the samples will be associated with the background data. Consequently, as the data from the camera's target image is sampled, the background data will tend to load heavily one or more adjacent counters. While each of the counters 26A–26J may be, if desired, implemented with additional higher order stages so that an overflow could not occur in the highest order stage during the sampling operation which takes place during the frame generation period, for the aforementioned circumstances this is not necessary.

For example, each of the sixteen stage counters 26A–26J is capable of counting the range of decimal numbers from 0 to 32,767, inclusive before its last stage $2^{15}$ overflows. The decimal numbers 0 and 32,767 are represented by all DOWN levels and all UP levels, respectively, at the outputs Q of the particular counters stages $2^0$ to $2^{14}$, and the output Q of the last stage $2^{15}$ is at a DOWN level for this entire range. Once a counter overflows, the outputs Q of its stages $2^0$–$2^{14}$ will be at DOWN levels and the output Q of its last stage $2^{15}$ at an UP level. Furthermore, as aforementioned, once a counter has overflowed it latches its higher order stages $2^{11}$ to $2^{15}$ by virtue of the DOWN level at the output $\bar{Q}$ of its stage $2^{15}$ that inhibits the particular NAND gate, e.g. NAND gate 32, which is connected to the input E of its stage $2^{11}$. As the sampling continues, the data from the background would continue to dominate for the given circumstances. From a statistical probability the one or more counters which overflowed would again be heavily loaded in their respective lower stages $2^0$–$2^{11}$ by the background data. For purposes of explanation, it is assumed by way of example, that the counters 24C to 26F overflow during the first frame generation period. At the end of this time period, the stages of the counters have values stored therein representing the nominal decimal values listed in Table II and relatively illustrated in FIG. 1C, as follows:

TABLE II

| Counter | Stage(s) $2^0$ to $2^{10}$ + | $2^{11}$ to $2^{14}$ | + $2^{15}$ = | No. of Samples |
|---|---|---|---|---|
| 26A | 4,000 | 0 | 0 | 4,000 |
| 26B | 8,000 | 0 | 0 | 8,000 |
| 26C | 2,047 | (13,185) | 32,768 | 46,000 |
| 26D | 2,047 | (15,185) | 32,768 | 50,000 |
| 26E | 2,047 | (19,185) | 32,768 | 54,000 |
| 26F | 2,047 | ( 7,185) | 32,768 | 42,000 |
| 26G | 12,000 | 0 | 0 | 12,000 |
| 26H | 10,000 | 0 | 0 | 10,000 |
| 26I | 18,000 | 0 | 0 | 18,000 |
| 26J | 6,000 | 0 | 0 | 6,000 |
| | | | Total | 250,000 |

For the reasons previously explained, once a counter has overflowed, data to its stages $2^{11}$–$2^{15}$ is inhibited and consequently the outputs Q of stages $2^{11}$-$2^{14}$ are at DOWN levels and the output Q of stage $2^{15}$ is at an UP level. For sake of clarity, however, the nominal decimal values in the stages $2^{11}$–$2^{14}$ of the overflowed counters 26C-26F are shown parenthetically in Table II.

As can be seen by the example of Table II, the total of the values actual and parenthetical equal the total number of samples taken per frame, assuming none of the samples are recorded twice, i.e. in two different counters, for reasons previously explained. Thus, for the aforementioned relative circumstances concerning the target and background contrast and geometrical characteristics, it is readily seen that the number of stages per counter required to count and store the samples is reduced.

Referring again to FIG. 3B, during the period that a frame of camera 3 is being generated, camera 3 is unblanked during each line scan period and blanked during each line retrace period in response to the DOWN and UP levels, respectively, of the line blank signal LB. During each frame generation period, e.g. period FIRST FRAME, the frame blank signal is maintained at a DOWN level corresponding to its unblanking level condition. At the start of each frame retrace period, e.g. FRAME RETRACE, and for the entire frame retrace period, the signal FB is placed in an UP level, thereby overriding the effects of the free-running line blank signal LB, and thereby blanking the camera 3. Thus, as shown in FIG. 3B, at time t12, the first frame period $t1$–$t12$ terminates and the first frame retrace period commences.

It should be noted, that each line time period TL as shown in FIG. 3A or 3B is equivalent to the sum of one line scan period 500T and its associated line retrace period 12T. Thus, for the given sampling example, period TL is equivalent to five hundred and twelve sampling cycle periods T of sampling signal HC. Each frame generation period TFG is equal to five hundred line time periods TL. The frame retrace period TFR in turn, for sake of simplicity is selected to be some adequate multiple of the line time period TL and which by way of example is shown in FIG. 3B as being 12TL. Each frame period TF has one frame generation period TFG and one frame retrace period TFR.

During a frame generation period TFG, the signals L1C to L10C and $\overline{L2C}$ to $\overline{L10C}$ from counters 26A to 26J, FIG. 3, and the signals L2V to L10V from converter 10, FIG. 2, are applied to the appropriate inputs of logic 27A, FIG. 4, and the appropriate inputs of logic 27B, FIG. 5, respectively.

Prior to time t1, a temporary UP level of a reset pulse signal R2 is provided by generator 21 and when inverted by inverter 59, c.f. FIG. 4, clears flip-flop 40. As a consequence, the output $\overline{Q}$ of circuit 40 is set to or maintained as the case might be at an UP level. The temporary DOWN level at the output of inverter 59 also places the respective inputs F of flip-flops 41–49 at DOWN levels. The UP level at the output $\overline{Q}$ of circuit 40 when inverted by inverter 50 places the respective F inputs of flip-flops 60–67 at DOWN levels. The states of the flip-flops 41–49 and 60–67 in turn will depend upon the levels at their respective inputs P.

As previously explained, prior to time t1 signals L1V–L10V are at DOWN levels since camera 3 is blanked. Moreover, the counters 26A–26J which have been previously cleared by a pulse signal R1 are now in 0 states, i.e. signals L1C–L10C are at DOWN levels. Hence, prior to time t, the AND gates corsponding to AND gate 36 of the AOI circuits 35 are inhibited and the outputs of these AND gates are at DOWN levels. NAND gates 51–58 are inhibited and their outputs are at UP levels. As a consequence, when the UP level of the reset pulse signal R2 is thereafter applied prior to time t1, these last mentioned AND gates remain inhibited by the DOWN levels of signals L1C–L10C and/or the DOWN level of inverted signal R2. The outputs of these last mentioned AND gates thus remain at DOWN levels. NAND gates 51–58 likewise remain inhibited by the DOWN level of signals L3C–L10C and their outputs remain at UP levels. The concurrent presence of an UP level to the inputs P and the now DOWN level at the output of inverter 50 to the inputs F of flip-flops 60–67 cause their outputs $\overline{Q}$ to be at UP levels, c.f. Table I. Signal DD at the output of NAND gate 68 is thus at a DOWN level.

The output of NAND gate 39 is on the other hand at an UP level since signal L9C is at a DOWN level. The UP level at the output of NAND gate 39 concurrently with the now DOWN level at the output of inverter 59 clears flip-flop 49 placing its outputs Q and $\overline{Q}$ at DOWN and UP levels, respectively. It should be noted that NAND gate 58 still remains inhibited by the DOWN level of signal L10C when this occurs. The DOWN level at output Q of flip-flop 49 when Anded with the now UP level at the output $\overline{Q}$ at flip-flop 40 by the AND gate corresponding to AND gate 37 of the appropriate AOI circuit 35, together with the DOWN level of the signal L8C appearing at an input of the other AND gate of the particular AOI circuit, causes the particular AOI circuit to provide at its output an UP level. The last mentioned UP level and the now DOWN level appearing at the output of converter 59 when applied to the inputs P and F, respectively, of flip-flop 48 in turn clear the latter. Again it should be noted that the output of NAND gate 57 does not change as signal L9C at its input is still in a DOWN level. As can be readily seen, a chain action effect is produced which causes flip-flops 41–49 to be cleared in an inverse sequence and the outputs of the AOI circuits 35 are placed and/or maintained as the case might be at UP levels. Moreover, signals $\overline{DAL2}$ to $\overline{DAL9}$ are now in DOWN levels as well as the signal DD. The pulse width of signal R2 is of sufficient duration to permit the aforementioned chain effect, the output Q of flip-flop 41 when being placed and maintained at a DOWN level as a result thereof having no effect on the flip-flop 40 because of the DOWN level present at the input F of flip-flop 40.

When signal R2 returns to its normally DOWN level prior to time t1, the output $\overline{Q}$ of flip-flop 40 does not change state and remains at an UP level. Since signals L1C-L10C are still at DOWN levels, as well as the levels at the outputs Q of flip-flops 41–49, the outputs of AOI circuits 35 and circuit 39 remain in UP levels. Thus, the now UP level at the output of inverter 59 which is applied to the respective inputs F of flip-flops 41–49 in coaction with the UP levels at the inputs P of flip-flops 41–49 causes no change in the latters output states, c.f. Table I, and so maintain the latter in their previously cleared condition, i.e., in 0 states. As a result, the AND gates, which corresponds to AND gate 36, of the AOI circuits 35 and NAND gate 39 are now in condition to detect overflows in the counters 26A–26J, which may occur during the subsequent first frame generation period and/or its associated frame retrace period. Each of the AND gates corresponding to AND gate 37 is also in condition to detect a change in state of the appropriate one of the flip-flops 42–49 that is connected to one of it inputs. Signal $\overline{DAL2}$ to $\overline{DAL9}$ appearing at the outputs Q of flip-flops 42–49, respectively, are at DOWN levels.

Also when signal R2 returns to its normally DOWN level prior to time t1, flip-flop 40 does not change state as aforementioned and consequently the DOWN level of inverter 50 in coaction with the UP level at the output of NAND gates 51–58 maintain the flip-flops 60–67 in their previously cleared states and the respective outputs $\overline{Q}$ of flip-flops 60–67 thus remain at UP levels. The simultaneous presence of UP levels to the inputs of NAND gate 68 causes signal DD to remain in a DOWN level.

Immediately prior to time *t*1, with signals DD and signals $\overline{DAL2}$ – $\overline{DAL9}$ and L2V–L9V in DOWN levels, the lamps 70 of circuit 12A–12I, c.f. FIG. 5, are turned off. Signals L2VD–L8VD are at UP levels and hence the output of AOI circuit 80 is at a DOWN level. Also, the not counterpart signals $\overline{LB}$ and $\overline{FB}$ are at DOWN levels, as well as the signals ADV, MY and $\overline{FB}$ are at DOWN levels, as well as the signals ADV, MY and 3MC at this time. Hence, NAND gate 89 provides an UP level at its output which results in signal ΔA being at a DOWN level irrespective of the levels of the outputs Q of flip-flops 87 and 88. Processor 11 is now ready to being recording the samples of the first frame generation period.

For purposes of discussion, for the example of Table II, it is assumed that sometime during the first frame generation period $t1$–$t12$, the fist counter to overflow is counter 26E, thereby placing a 1 bit in its last stage $2^{15}$. The resultant UP level of its output signal L5C is ANDed with the UP level of the output signal L6C of the succeeding counter 26F, which has not overlfowed, in the fifth AOI circuit 35 as viewed from top to bottom in FIG. 4. The output of the last mentioned AOI circuit consequently goes to a DOWN level. The complementary DOWN level os signal $\overline{L5C}$ is ANDed with the DOWN level of signal L4C of counter 26D, which also has not overflowed, in the fourth AOI circuit and causes the latter to remain in its UP level and consequently the levels at outputs Q, $\overline{Q}$ of flip-flop 44 do not change as a result of the change in level of signal $\overline{L5C}$ being applied thereto.

However, the concurrent presence of DOWN and UP levels at the inputs P and F, respectively, of flip-flop 45, sets circuit 45 to a 1 state, c.f. conditions of Table I. The resultant UP level at the output Q of flip-flop 45 when ANDed with the UP level of output $\overline{Q}$ of flip-flop 40 in the fourth AOI circuit 35 causes the output of this AOI circuit to apply a resultant DOWN level to the input P of flip-flop 44. This DOWN level in conjunction with the UP level to its input F sets flip-flop 44 to a 1 state. As is readily apparent, another chain reaction effect is produced by the first overflow which when detected by the appropriate one of the circuits 35, 39 changes the output of that particular circuit from an UP to a DOWN level thereby setting the flip-flop, which has its input P connected to it, to a 1 state. The change to the 1 state of that flip-flop in turn causes the output of the preceding AOI circuit, which has the particular one of its input connected to the output Q of that flip-flop, in turn to change from UP to a DOWN level, which in turn causes the next flip-flop to be set to a 1 state, etc. Thus, in the particular example, the first overflow results in flip-flops 41-45 to be set to 1 states in an inverse succession.

Flip-flop 41 on being set to a 1 state sets flip-flop 40 to a 1 state. The output $\overline{Q}$ of flip-flop 40 thus goes to a DOWN level. It should be understood that a constant UP level signal source, not shown, is connected to the input D of flip-flop 40 at terminal 40A. The output $\overline{Q}$ of flip-flop 40 remains in the DOWN state until the application of the next reset pulse signal R2 which occurs at the beginning of the first frame retrace period, c.f. time t12.

When the overflow in counter 26E occurs, it will be noted that just prior to the resulting change in state of first the flip-flop 45 and then of flip-flop 44, the input signals $\overline{L4C}$, L5C and L4 to NAND gate 53 are at UP levels thereby placing a DOWN level at the input P of flip-flop 62 together with the DOWN level at its F input from converter 50. Flip-flop 62 is temporarily placed in an unstable condition, c.f. Table I. However, the component circuits of logic 27 are judiciously selected to have response times such that the duration of this unstable condition is negligible and the rise time associated with the signal DD will be insufficient to cause the latter to reach the threshold level required to turn-on transistor 69 and/or lamp 70 of circuit 12A, and/or will be turned-on so briefly that its effect is negligible. As soon as the flip-flop 45 and the flip-flop 44 change state, NAND gate 53 is again inhibited by another DOWN level signal; to wit: signal L5. Accordingly, the UP and DOWN levels to its inputs P and F, respectively, cause flip-flop 62 to return to a stable condition and its output $\overline{Q}$ to return to an UP level. As a result, signal DD returns or remains, as the case might be, to a DOWN level.

Also when signal $\overline{L5}$ at the output $\overline{Q}$ of flip-flop 45 goes from an UP to a DOWN level in response to the overflow in counter 26E, it together with the DOWN levels of input signals $\overline{L5C}$ and $\overline{L6C}$ further inhibit NAND gate 54 and the latter's output thus remains at an UP level. The output $\overline{Q}$ of flip-flop 63 thus remains at an UP level and signal DD remains in a DOWN level. Similarly, the changes in levels of signals $\overline{L2}$ and $\overline{L3}$ from UP to DOWN levels will not change the UP levels of the outputs $\overline{Q}$ of flip-flops 60 and 61.

Hence, just prior to the time when the output $\overline{Q}$ of flip-flop 40 changes from an UP to DOWN state as a result of the overflow in counter 26E, the output of the first five AOI circuit 35 as viewed from the top are at DOWN levels, and all the other AOI circuits 35 and NAND gate 39 are at UP levels. Furthermore, the outputs Q of flip-flops 40–45, are at UP levels and those of flip-flops 46–49 at DOWN levels, and the outputs $\overline{Q}$ of flip-flops 60–67 are at UP levels. Also, the output of NAND gates 51–58 are at UP levels.

When the output $\overline{Q}$ of flip-flop 40 changes from an UP to a DOWN state as a result of the overflow in counter 26E and the consequent chain action effect through flip-flops 41–45, the resultant UP level at the output of inverter 50 together with the UP levels of the outputs of NAND gates 51–58 which are applied to the inputs F and P, respectively, of flip-flops 60–67 causes no change in the states of flip-flops 60-67 and consequently the outputs $\overline{Q}$ of the latter remain at UP levels and signal DD at a DOWN level.

With the output $\overline{Q}$ of flip-flop 40 now in the DOWN level, the lower AND gates, i.e. those corresponding to AND gate 37, of the AOI circuits 35 are inhibited. These inhibited gates in conjunction with the inhibitions provided by the still DOWN level input signals L1C–L4C and L6C–L10C to the other AND gates, i.e. those corresponding to AND gate 36, of the first four and last three AOI circuits as viewed from top to bottom in FIG. 4, cause these AOI circuits to be placed in and remain at, respectively, UP levels. NAND gate 39 is still inhibited by the DOWN level of signal L9C and hence its output is still at an UP level. Because of the UP levels of signals L5C and L6C, the output of the particular AOI circuit to which they are applied continues to remain at a DOWN level. The concurrent presence of concurrent UP levels to the inputs P and F of flip-flops 41–44 and 46–49 causes no change in their output levels, i.e. the outputs Q of flip-flops 41–44 remain at UP levels and those of flip-flops 46–49 remain at DOWN levels, c.f. Table I.

The concurrent presence of DOWN and UP levels to its inputs P and F, respectively, results in a set condition, c.f. Table 1, to flip-flop 45 and hence its output Q also remains at an UP level.

As can readily be seen, thereafter any changes in the levels of signals L1C–L4C, L6C due to subsequent sampling during the frame generation period and/or the aforementioned count-up operation during the first frame retrace period will not change the UP levels of the outputs Q of flip-flops 41-45. For the reasons previously explained, signal L5C will remain in an UP level as stages $2^{11}$–$2^{15}$ of counter 26E are latched by the DOWN level of the signal at its output $\overline{Q}$ resulting from the overflow. Each of the flip-flops 46 to 49 on the other hand is subject to a change in state if there is a subsequent change in the particular input signal pair, i.e. signal pairs L6C and $\overline{L7C}$, L7C and $\overline{L8C}$, L8C and $\overline{L9C}$, and L9C and $\overline{L10C}$, to the particular AOI circuit 35 or NAND circuit 39 to which the input P of the particular flip-flop is connected, which causes that particular AOI circuit or NAND gate 39 to go from its UP level to its DOWN level. This DOWN level at its input P and the UP level at its input F, sets the particular one of the flip-flops 46–49 to an UP state and it thereafter remains in that state until the application of the reset pulse signal R2 at time t12.

It will now be assumed further for purposes of explanation that for the example of Table II that during the first frame generation period overflows occur in the following counters and sequence, to wit: counters 26D, 26C and 26F. Moreover, it is further assumed that the DIP characteristic in the data being sampled is not detected during the first frame generation period but is subsequently detected during the count up operation.

For the reasons previously explained, the overflows in counters 26D and 26C do not effect a change in state in flip-flops 43–45, and consequently the outputs Q of flip-flops 41–45 and the outputs $\overline{Q}$ of flip-flops 60–63 remain at UP levels. Signals L3C and L5C are now at UP levels and stage $2^{11}$–$2^{15}$ of counters 26C and 26D are latched. When counter 26F overflows, it places a 1 bit in its last stage $2^{15}$, i.e. its output signals L6C and $\overline{L6C}$ are at UP and DOWN levels, respectively. As a result, the stages $2^{11}$–$2^{15}$ of counter 26F become latched. The DOWN level signals $\overline{L5C}$ and $\overline{L5}$, however, continue to inhibit NAND gate 54 and consequently the output $\overline{Q}$ of flip-flop 63 remains in an UP level.

The now UP level of signal L6C from counter 26F and UP level of signal $\overline{L7C}$ from counter 26G, which has not yet overflowed, causes the AOI circuit 35 to which they are jointly applied to go from an UP to a DOWN level at the AOI's output. The DOWN level at its input P in concurrence with the UP level at its input F, causes flip-flop 46 to be set to a 1 state, i.e. its output Q goes from a DOWN to an UP level. The resultant DOWN level of its $\overline{Q}$ output signal $\overline{L6}$ further inhibits NAND gate 55 with DOWN level signals L7C and $\overline{L6C}$, and consequently the output of flip-flop 64 remains in an UP level. Because the lower AND gates, i.e. those corresponding to AND gate 37, in the AOI circuits 35 are inhibited by the DOWN level of the output $\overline{Q}$ of flip-flop 40, the now UP level at output Q of flip-flop 46 does not change the output of the fifth AOI circuit to which it is applied. As a consequence, the output $\overline{Q}$ of flip-flop 63 also remains in an UP level. As previously explained, flip-flop 46 now remains in an UP state until the next reset pulse signal R2.

It can readily be seen that alternatively if in lieu of counter 26F overflowing in the given example another one of the counters 26G–26J had overflowed, then similarly only the appropriate one of the flip-flops 47–49 would change state in response thereto and its respective output Q would go from a DOWN to an UP level.

For the given example being described, i.e. where counters 26C–26F overflowed and the others not overflowed, immediately prior to the commencement of the frame retrace period and after the last sample has been taken and recorded in the appropriate counter, i.e. during the line retrace period which follows the last line scan of the first frame generation period, signals L1C, L2C, L7C–L10C are at DOWN levels, and signals L3C–L6C are at UP levels. The outputs of the sixth AOI circuit as viewed from top to bottom in FIG. 4 is at a DOWN level, and the remaining AOI circuits 35 and NAND circuit 39 are at UP levels. The output Q of flip-flop 40 is at a DOWN level, and the outputs Q of flip-flops 41–46 and the outputs $\overline{Q}$ of flip-flops 60–67 are at UP levels. The outputs Q of flip-flops 47–49 are at DOWN levels, as is the level of signal DD.

At time t12, the first frame retrace period begins and in synchronization therewith signal R2 goes from a DOWN to an UP level. Signal R2 remains in a UP level for a time duration TL returning to its DOWN level at time *t*13. During the time period *t*12–*t*13, the resultant DOWN level at the output of inverter 59 clears flip-flip 40, the output $\overline{Q}$ of the latter going from a DOWN to an UP level.

Flip-flops 41–45 and 47–49 which have UP levels at their respective inputs P are likewise placed in cleared conditions and the outputs $\overline{Q}$ of flip-flops 41–45 thus go from DOWN to UP levels, while those of flip-flops 47–49 remain at UP levels. Flip-flop 46 is, however, placed in an unstable condition. Nevertheless, since signal $\overline{L6C}$, as well as signal L7C, is at a DOWN level NAND gate 55 still remains inhibited. The unstable condition of flip-flop 46, in coaction with the now UP level at the output $\overline{Q}$ of flip-flop 40 may cause an inverse chain reaction effect which places the flip-flops 41–45 in unstable conditions. Since the DOWN level at the input F of flip-flop 40 overrides any change in the level to its input E, it output $\overline{Q}$ remains in an UP level during the period *t*12–*t*13. Moreover, because signals $\overline{L3C}$ – $\overline{L5C}$ are at DOWN levels, NAND gates 52–54 remain inhibited. The output of NAND gate 51 on the other hand goes to a DOWN level as the result of flip-flop 42 being cleared and its output signals $\overline{L2}$ going to a DOWN level. As a result, flip-flop 60 is placed in an unstable condition during the time period *t*12–*t*13. The presence of the aforementioned unstable conditions in flip-flops 41–46, 60 is not detrimental to the operation of the processor 11 and these flip-flops are returned to stable conditions when signal R2 returns to its DOWN level at time t13.

More specifically, at time t13 the UP level at the output of inverter 59 stabilizes flip-flops 41–49. Since the inputs P of flip-flops 47–49 are also at UP levels at time t13, the levels at the outputs Q of flip-flops 47–49 remain at DOWN levels. The DOWN and UP levels at the inputs P and F, respectively, of flip-flop 46 sets flip-flop 46 and places or maintains, as the case might be, an UP level at its output Q. Since the output $\overline{Q}$ of flip-flop 40 is still in an UP level, it together with the UP level at the output $\overline{Q}$ of flip-flop 46 causes the output of the fifth AOI shown in FIG. 4 to go to a DOWN level thereby setting flip-flop 45 and its output Q to an UP level. As is readily seen, a chain reaction results which sets the flip-flops 40-46 in an inverse sequence.

When signal $\overline{L2}$ of flip-flop 42 goes to a DOWN level as a result of this aforementioned chain reaction, NAND 51 is inhibited and places an UP level and the input P of flip-flop 60 which occurs prior to the output of inverter 50 going to an UP level. As a result flip-flop 60 is cleared and its output $\overline{Q}$ is placed at an UP level. A short time later, due to the inherent delay in the circuits, the output of inverter 50 is placed in an UP level when the output $\overline{Q}$ of flip-flop 40 is placed in a DOWN level in response to the flip-flop 41 being placed or maintained as the case might be in a cleared condition because of the last mentioned chain reaction. As a result of the UP level signals at its inputs P and F, the output $\overline{Q}$ of flip-flop 60 remains at an UP level. Likewise, the output $\overline{Q}$ of flip-flops 61–67 remain at UP levels and hence signal DD is at a DOWN level.

The output Q of flip-flops 41–46 are now at UP levels. Moreover, NAND gates 51–55 are inhibited by the DOWN levels at the outputs $\overline{Q}$ of flip-flops 42–46, respectively. Consequently, during the subsequent count-up operation any overflows in the non-overflowed counters 26A and 26B will not cause any change in the signal levels at the outputs Q and $\overline{Q}$ of flip-flops 41 and 42 and hence will not change the UP level of the output of NAND gate 51. Likewise, during the subsequent count-up operation the outputs of NAND gates 52–55 remain at UP levels since signals L1C to L6C are latched and at UP levels. The processor 11 is now ready to determine if a DIP characteristic is present in the data contained in the counters 26G–26J.

At time t14, the count-up operation begins. In synchronization therewith signal GC is placed in a DOWN level thereby causing the outputs of the NAND gates of counters 26A–26J which correspond to NAND gates 31 to go to an UP level. Simultaneously, signal CU is converted to a pulse train signal. Each time the signal CU goes from an UP to a DOWN level, the count in the respective upper stages $2^{11}$–$2^{15}$ of each of the non-overflowed counters 26A, 26B, 26G–26J, is advanced one bit. As is apparent to those skilled in the art, for the worst possible case, i.e. all zeros in each of the stages $2^{11}$–$2^{15}$ of one of the non-overflowed counters, sixteen count-up pulses would be required to overflow the particular counter, that is, to place a 1 bit in its last stage $2^{15}$. However, for sake of convenience, the count-up pulses of signal CU are applied continuously during each count-up operation the time period, e.g. period *t*14–*t*15. Each count-up operation time period is synchronized to coincide with the 503rd period TL, i.e. line count 502, associated with each frame period TF.

Moreover, the count-up pulses of signal CU are derived from the same basic clock signal of generator 21 from which the sampling pulses HC are derived and have the same periodicity T. Consequently, during each count-up operation period, there is provided a total of five hundred and twelve count-up pulses, the first pulse of the train going to its DOWN level at the commencement of the line count 502 time period, and the last pulse going to a DOWN level 511 time periods T later and being returned to its UP level prior to the commencement of line count period LC503. For sake of clarity only a few of the pulse are shown in FIG. 3B in the pulse train portions of signal CU.

For purposes of explanation and for the assumed values of Table II, it will be further assumed that during the count-up operation period *t*14–*t*15, the counters 26G–26J overflow with respect to each other in the following sequence, first counter 26I, next counter 26G, next counter 26H and lastly counter 26J.

When counter 26I overflows signal L9C is placed in an UP level and is latched thereto by its counterpart signal $\overline{L9C}$ which goes to a DOWN level. As a result the output of the last AOI circuit 35 goes to an UP level which is applied to the input P of flip-flop 48. Since an UP level is also being applied to the input F of flip-flop 48, the output $\overline{Q}$ of flip-flop 48 remains in an UP level. Consequently, the UP levels of the three input signals $\overline{L8C}$, L9C and $\overline{L8}$ to NAND gate 57 cause the output of the latter to go to a DOWN level. This DOWN level at its input P together with the UP level at its input F sets flip-flop 66 causing its output $\overline{Q}$ to be placed at a DOWN level. The DOWN level when applied to the appropriate input of NAND gate 68 causes signal DD to go from a DOWN to an UP level indicating the presence of a DIP characteristic. It should be noted that the logic 27 at this time is in effect recognizing that between two non-adjacent and overflowed counters, to wit: counters 27F and 27I, there is at least one counter, to wit: either counter 26G or 26H, which has not overflowed. Consequently, it in effect recognizes a DIP characteristic is present in the data being analyzed.

Signal L9C which is now in an UP level together with the UP level of signal $\overline{L10C}$ places, via NAND gate 39, a DOWN level at the input P of flip-flop 49. Since flip-flop 49 has an UP level at its input F, flip-flop 49 is set to a 1 state. The resultant DOWN level signal $\overline{L9}$ further inhibits NAND gate 58 together with the DOWN level of signal L10C. As a consequence, the output Q of flip-flop 67 remains in an UP level. It should now be noted that at this time signals $\overline{DAL2}$ – $\overline{DAL6}$ and $\overline{DAL9}$ are all at UP levels and signals $\overline{DAL7}$ and $\overline{DAL8}$ are at DOWN levels.

When the next counter 26G overflows in the given example, signal L7C goes to an UP level and becomes latched. This UP level when ANDed with the UP level of signal $\overline{L8C}$ in the appropriate AND gate of the seventh AOI circuit places a DOWN level at the input P of flip-flop 47. This DOWN level at the input P causes flip-flop 47 to be set to a 1 state placing UP and DOWN levels at its inputs Q and $\overline{Q}$, respectively. As a result signal $\overline{DAL7}$ is now in an UP level and signal $\overline{L7}$ is at a DOWN level. Signal $\overline{L7}$ further inhibits NAND gate 56 together with the DOWN level of signals $\overline{L7C}$ and L8C. As a result the output $\overline{Q}$ of flip-flop 65 remains in an UP level. At this time, signals $\overline{DAL2}$ – $\overline{DAL7}$ and $\overline{DAL9}$ are at UP levels and signal $\overline{DAL8}$ is at a DOWN level.

When the next counter 26H overflows in the given example, example, signal L8C goes to an UP level and is latched. However, since signal $\overline{L9C}$ is at a DOWN level, the output, which is connected to the input P of flip-flop 48, of the eighth AOI circuit 35 remains at an UP level. The concurrent presence of the UP levels to the inputs P and F of flip-flop 48 cause no change in its outputs Q and $\overline{Q}$ and consequently signal $\overline{DAL8}$ and L8 remain at DOWN and UP levels, respectively. Flip-flop 57 is now inhibited by the DOWN level of signal $\overline{L8C}$ thereby providing an UP level at its output. However, the concurrent presence of the two UP level signals present at its inputs P and F, does not cause a change in state of the flip-flop 66 and consequently the DOWN level at output $\overline{Q}$ of flip-flop 66 becomes latched and the signal DD remains at an UP level. Thus, the processor 11 has detected the presence of a DIP characteristic in the input data, signals L1V-L10V, and the intermediate class, i.e. brightness level 8, associated with the detected DIP characteristic, as represented by the UP level of signal DD and DOWN level of signal $\overline{DAL8}$, respectively.

If in the given example, the counters 26A–26J had overflowed in the aforedescribed same sequence but during the frame generation time period exclusively, the flip-flops 41–49, 60–67 would have been similarly latched during the frame generation period. Since the overflowed counters are latched, any subsequent clearing of the flip-flops 40–49, 60–67 resulting from the application of signal R2 at the commencement of the frame retrace period would only be temporary. When signal R2 reverts to its DOWN level the information would be restored on the respective flip-flops 41–49, 60–67.

In either case at the end of the line count time period LC502, the processor 11 will provide output signals indicating the presence of a DIP characteristic and its associated intermediate class. If no DIP characteristic is present the signal DD is at a DOWN level.

Signals DD are DAL2–DAL9 as aforementioned control the amplifiers 69 of circuits 12A-12I, respectively, which in turn control their associated lamps 70. To simplify the circuitry, the lamp 70 associated with the DIP detected characteristic indication and those associated with the intermediate class associated with the detected DIP characteristic and all the higher order classes are turned on. In the foregoing example only the lamps 70 of circuit of 12A, 12H and 12I will be turned on, indicating the presence of a DIP characteristic and its associated intermediate class, respectively.

The operation of the logic portion of circuits 12A–12I will be described hereinafter in conjunction with the following description of the centroid processor 15.

CENTROID PROCESSOR 15

If a target in the field 1 is detected during a given frame period TF, on the next succeeding frame period the centroid processor 15 determines the centroids X*c*, Y*c* of the target. Concurrently, during this next frame period the histogram processor 11 again detects for the presence of a DIP characteristic.

The centroid X*c*, Y*c*of the target area is found by solving the following equations:

$$Xc = (My/A) = (\Sigma X\alpha A/\Sigma\Delta A) = (x1\Delta A + x2\Delta A \ldots xi\Delta A)/(\Sigma\Delta A); \text{ and} \quad (1)$$

$$Yc = (Mx/A) = (\Sigma Y\Delta A/\Sigma\Delta A) = (y1\Delta A + y2\Delta A \ldots yi\,\Delta A)/(\Sigma\Delta A); \quad (2)$$

where:

- *x*1, *x*2 . . . xi = the individual X address locations of the target area at the points where it is sampled and recorded;
- *y*1, *y*2 . . . *yi* = the individual Y address locations of the target area at the points where it is sampled and recorded;
- M*x* = the moment of the target area A about the X axis;
- M*y* = the moment of the target area A about the Y axis; and
- ΔA = is an elemental unitary value of the target area A.

To illustrate the foregoing by way of example, a simple rectangular target area image is assumed to be present which when scanned provides five valid successive recorded samples on the 101st, 102nd, 103rd, 104th, and 105th sampling pulses associated with each of three succeeding scan lines; to wit; the 301st, 302nd, 303rd lines. For sake of clarity, the X and Y address information and corresponding number of recorded samples ΔA, and calculations of the values ΣX, ΣY, and ΣΔA are tabulated in Table III as follows:

Table III

LOCATION

| | X Address Information | Y Address Information | ΔA |
|---|---|---|---|
| | x1=101 | y1=301 | 1 |
| | x2=102 | y2=301 | 1 |
| | x3=103 | y3=301 | 1 |
| | x4=104 | y4=301 | 1 |
| | x5=105 | y5=301 | 1 |
| | x6=106 | y6=302 | 1 |
| | x7=102 | y7=302 | 1 |
| | x8=103 | y8=302 | 1 |
| | x9=104 | y9=302 | 1 |
| | x10=105 | y10=302 | 1 |
| | x11=101 | y11=303 | 1 |
| | x12=102 | y12=303 | 1 |
| | x13=103 | y13=303 | 1 |
| | x14=104 | y 14=303 | 1 |
| | xi=x15=+105 | yi=y15=+303 | +1 |
| Totals: | ΣX=1545 | ΣY=4530 | ΣΔA=15 |

Substituting the calculated values of ΣX, ΣY and ΣΔA in equations (1) and (2), the centroids for the assumed example of Table III are obtained as follows:

$$Xc = (1545/15) = 103; \text{ and} \quad (3)$$

$$Yc = (4530/15) = 302. \quad (4)$$

Figure 6:
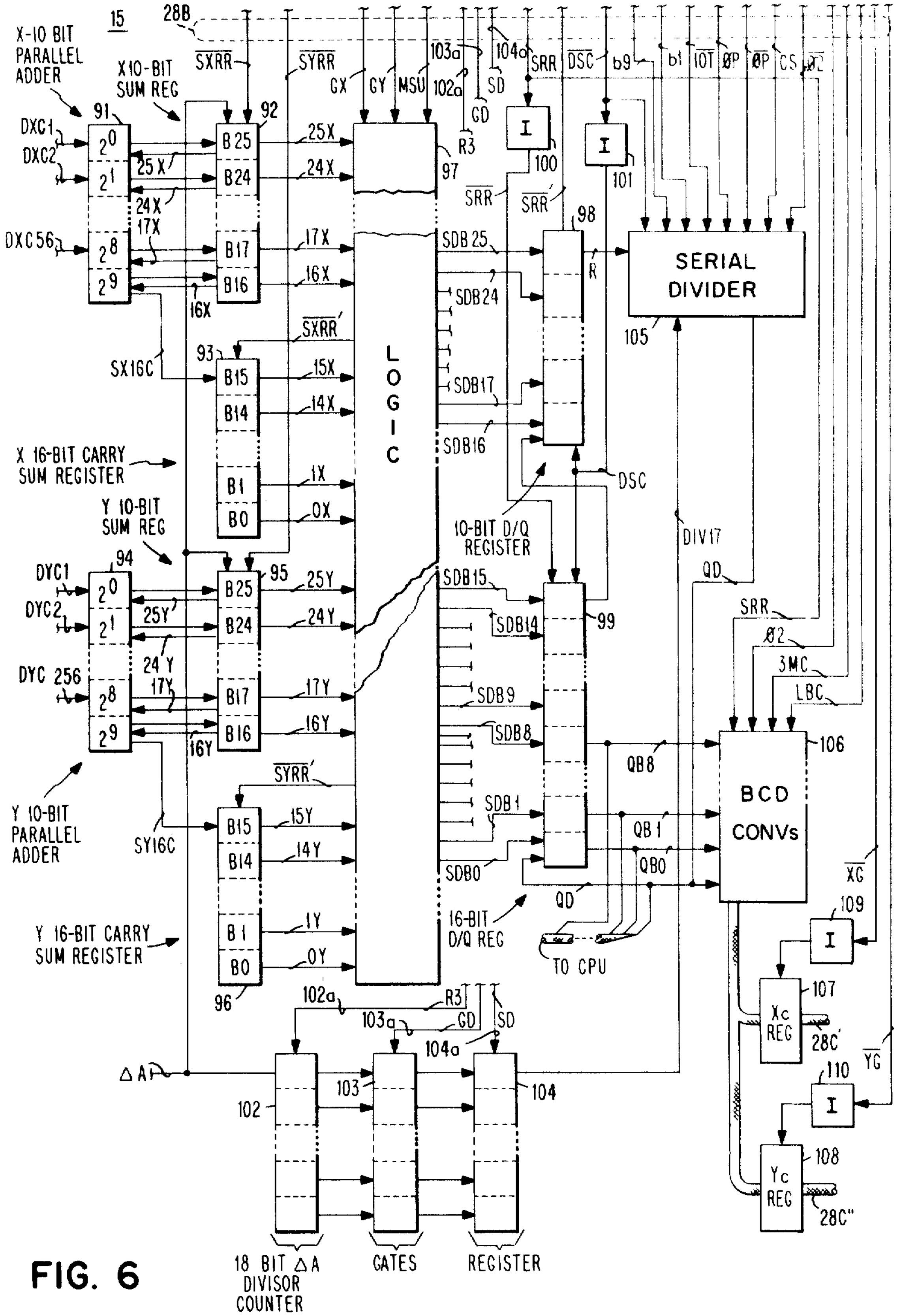
FIG. 6 is a detailed block diagram of the CENTROID PROCESSOR and NUMERICAL DISPLAY shown in FIG. 1.

Referring now to the block diagram of the centroid processor 11 shown in FIG. 6, circuit 91–93 is used to form the moment My = ΣXΔA. For the given samples/-line/frame example, there are five hundred and twelve X positions associated with each line period; to wit; the five hundred actual positions associated with the line generation period and the twelve equivalent positions associated with its line retrace period. In synchronization with the beginning of each line period, signal generator 21 provides five hundred and twelve sequential X count signals in parallel binary form, i.e. the nine digital signals DXC1–DXC256, which correspond to the momentary X positions of the camera beam. Thus, at the beginning of each line period, the first X position in the line corresponds to all DOWN levels in the signals DXC1–DXC256, i.e. binary 000000000 = decimal 0. At the end of each line period, the blanked beam will have reached the end of its final retrace or last line position and the last, i.e. the 512th, position in the line will correspond to all UP levels in the signals DXC1–DXC256, i.e. binary 111111111 = decimal 511. Consequently, when the next line period begins the all UP levels of the signals DXC1-DXC256 return to DOWN levels and the cycle is repeated.

The X address data of the five hundred and twelve X positions are fed, in sequence, as nine parallel addend bits, i.e. DXC1-DXC256, to the first nine stages $2^0$ of $2^8$, respectively, of the ten bit parallel adder 91. The $2^9$ stage adder 91 is a carry stage. The addend bits DXC1-DXC256 are added to the augend bits **25*x*–17*x*, respectively, from the first nine stages B25–B17, respectively, of the ten bit sum register 92 under the control of the signal ΔA and the resultant sum replaces the augend in the register 92, sometimes referred to in the art as an accumulator. Carry stage B16 of register 92 adds its augend bit 16x in the carry stage $2^9$ of register 91 to the carry of stage $2^8$ of register 91. Carrys from stage $2^9$ of register 91 in turn are fed to the input of a serial 16-bit carry sum register 93 which extends the capacity of the accumulator or register 92. In this manner at the end of the frame generation period, which follows a frame period in which a DIP characteristic was detected, the product ΣXΔA is accumulated in the register 92-93**.

Concurrently, and in a similar manner, the product ΣYΔA is formed by the circuitry 94–96. Signal generator 21 provides five hundred and twelve line or Y count signals, i.e. the nine digital signals DYC1–DYC256, corresponding to the five hundred and twelve lines or Y positions associated with the frame generation period and the twelve equivalent lines associated with its frame retrace period. Again, the line count signals are synchronized with each frame period and all DOWN and all UP levels in the addend bits of signals DYC1-DYC256 correspond to the 1st and 512th line counts, respectively. At the end of the frame generation period, which follows a frame period in which a DIP characteristic was detected, the product ΣYΔA is accumulated in register 95–96.

Logic 97 is provided with gating circuitry which inter alia gates during the frame retrace period first the product ΣXΔA and then product ΣYΔA in a predetermined manner to a pair of linked registers 98, 99. Control signals GX, GY, MSU from generator 21 are applied to logic 97. Similarly control signals SRR, $\overline{SRR}'$, $\overline{DSC}$ from generator 21 are applied to the respective registers 98 and 99, either directly, e.g. $\overline{SRR}'$, or indirectly via inverters 100 and 101. Consequently, at the outputs SDB0–SDB25 of logic 97 when appropriately gated will be either the data bits of signals 0X–25X, respectively, or the data bits of signals 0Y–25Y, respectively, as the case might be. The data bits at outputs SDB0–SDB25 represent the respective dividends or numerators of the equations (1) and (2).

The product ΣΔA is also concurrently formed in the counter 102 as the products ΣXΔA and ΣYΔA are being formed during the frame generation period. Counter 102 counts the number of times signal ΔA is present in the particular frame period, the counter 102 being previously cleared before each frame generation period by a signal R3 applied to the reset input 102a. Gates 103 under the control signal GD which is applied to the common control input 103a gates the information from counter 102 to a register 104 which stores it for use as the divisor of equations (1) and (2). At appropriate times during the frame retrace period the dividend information of register 98 is divided by the divisor information of register 104 in coaction with the serial divider 105 until the resultant quotient appears in the lower nine stages, i.e. the stages having the ouputs QB0–QB8, of the 16 bit register 99. The outputs QB0–QB8 of these last mentioned stages are converted to a binary coded decimal form by the BCD converter 106. A pair of registers 107 and 108 are provided to store the centroids X*c* and Y*c*, respectively, in their BCD forms. The register 107–108 are periodically cleared by respective reset signals $\overline{XG}$ and $\overline{YG}$ via inverters 109 and 110, respectively.

Figure 7A:
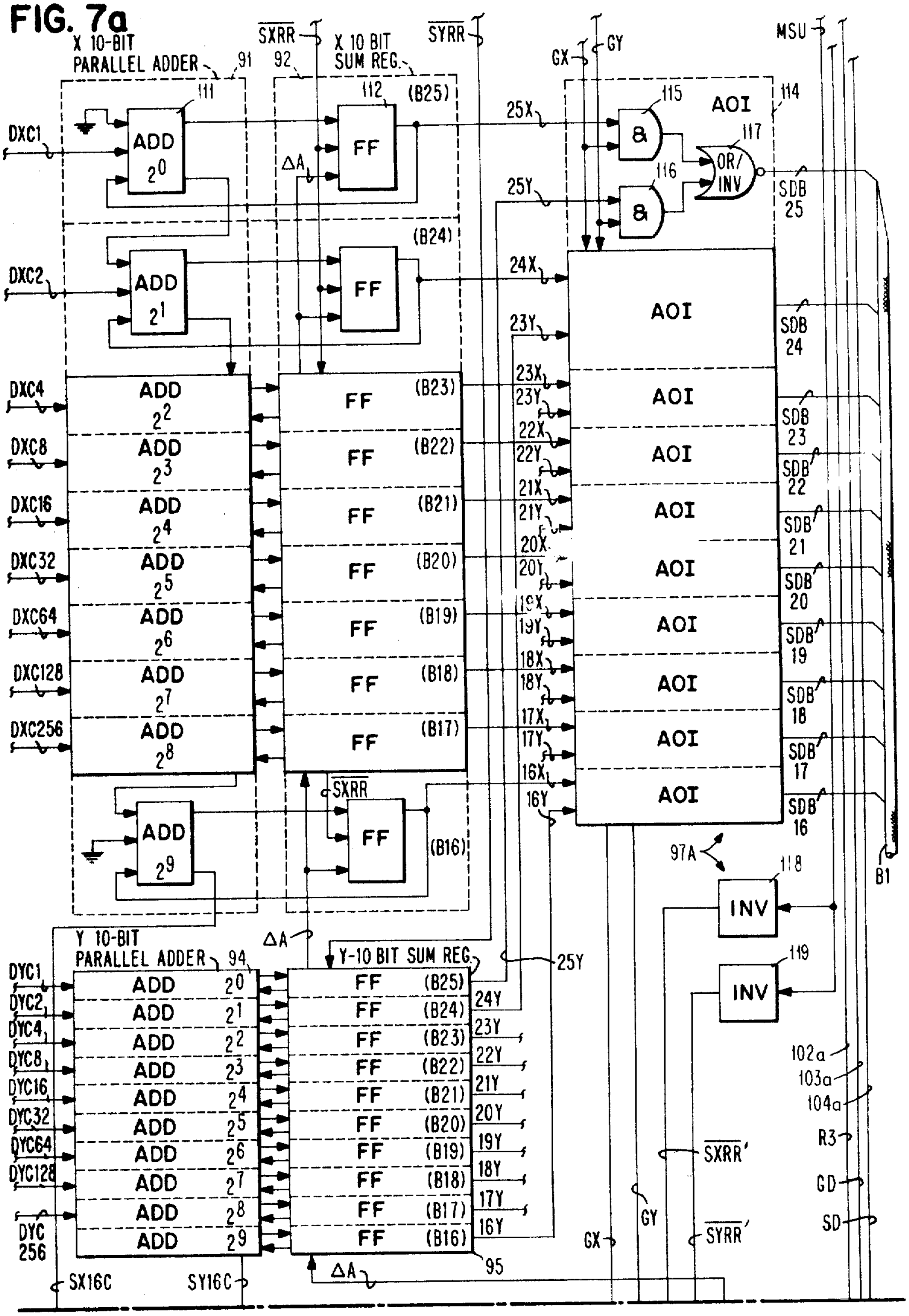
FIGS. 7*a*–7*b* are more detailed block diagrams of the $\Sigma X\ \Delta A$, $\Sigma Y\ \Delta A$ and $\Sigma \Delta A$ function generators and the LOGIC shown in FIG. 6.
Figure 7B:
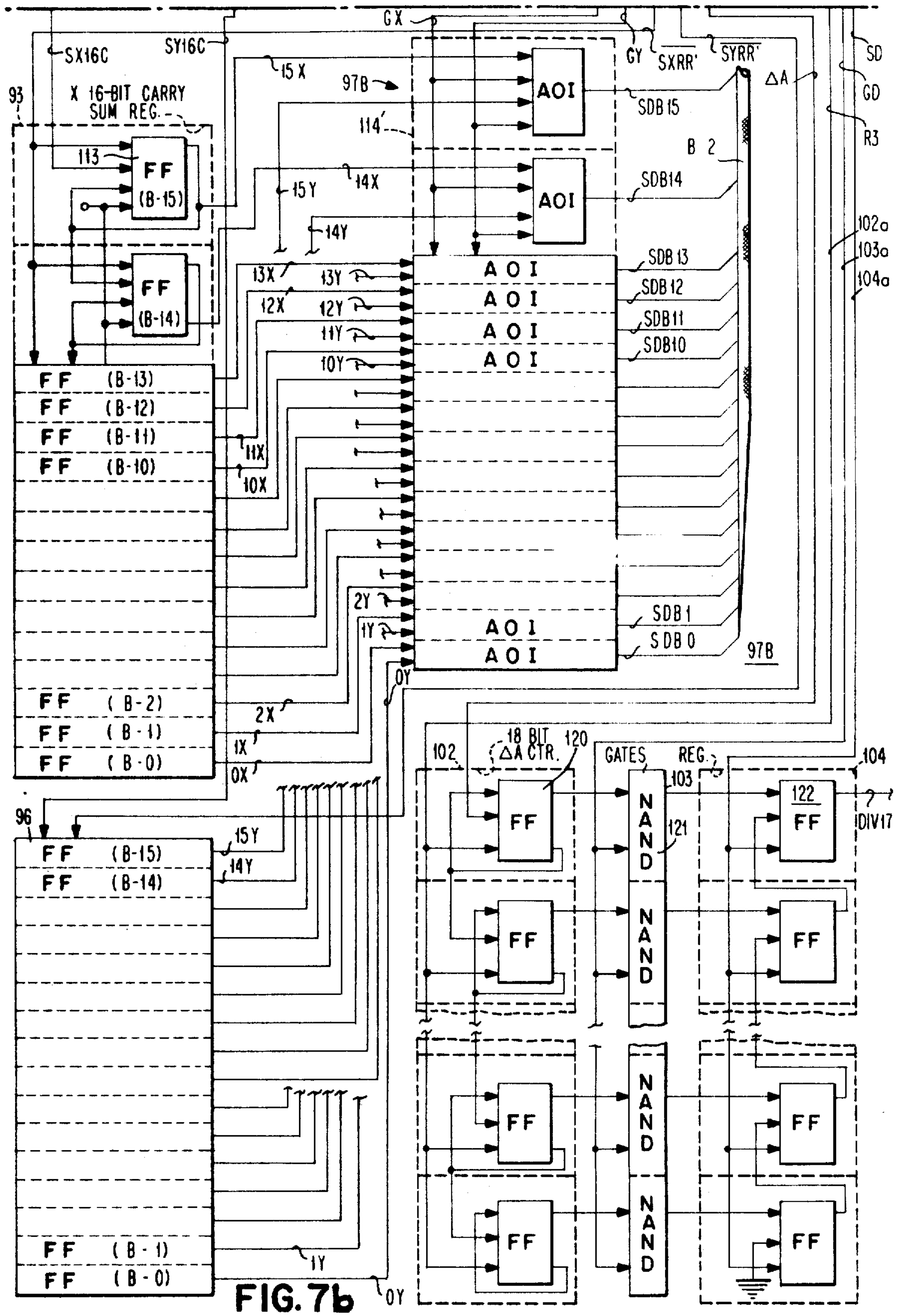
Figure 8:
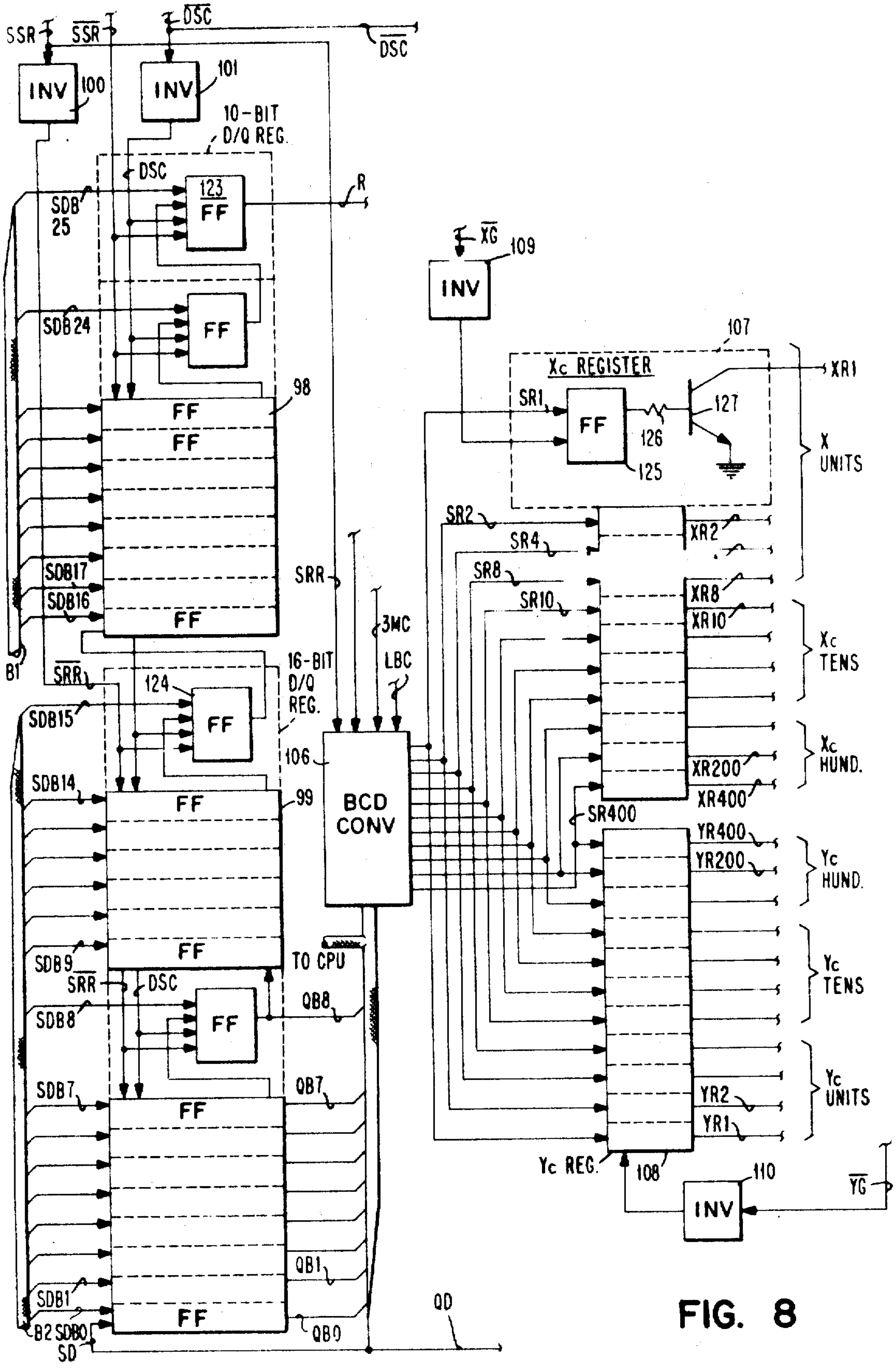
FIG. 8 is a more detailed block diagram of the D/Q registers and the Xc and Yc REGISTERS shown in FIG. 6, the BCD CONVERTER of FIG. 6 being also illustrated in FIG. 8 in simplified block form for sake of clarity.

Referring now to FIGS. 7*a*–7*b* and 8, the centroid processor 11 of FIG. 6 will now be described in greater detail. Each of the stages $2^0$–$2^9$ of adders 91 and 94 includes an identical adder circuit, e.g. circuit 111 of adder 91 designated by the legend ADD $2^0$. If during a particular frame period a DIP characteristic is detected, then during the frame generation period of the next frame period signal ΔA is generated whenever the brightness level of the camera's target image is out or above the class associated with the detected DIP characteristic in a manner hereinafter described. Whenever the signal ΔA is generated by the logic 27, c.f. FIG. 5, during such a frame generation period it concurrently conditions the stages, e.g. flip-flop stage 112, of the ten bit sum registers 92 and 95. Since the X counts and Y or line counts are synchronized with the beam scan position of camera 3 then the location of the particular point on the image of camera 3, which has a brightness level which causes the signal ΔA to be generated, is likewise synchronized with the generation of the particular signal ΔA. Under the control of signal ΔA, the information in the register 92 is added to the information in the adder 91 and the resultant sum stored in the accumulator or register 92 in a manner well known to those skilled in the art. A similar action occurs with respect to the registers 94 and 95. As the frame generation period continues, and the information stored in the ten bit sum registers 92 and 95 increases, the respective carry stages $2^9$ of adders 91 and 94 add the carrys from the respective stages $2^8$ of adders 91 and 94 with the carrys of the stages B16 of registers 92 and 95, respectively. The carrys SX16C and SY16C of the carry stages $2^9$ of adders 91 and 94 in turn are fed to the 16 bit carry sum registers 93 and 96, respectively. As shown in FIG. 7*b* each of the sum registers 93 and 96 is configured as having sixteen serially connected flip-flop stages, e.g. flip-flop 113.

Each of the outputs 25x–0X of register 92–93 is connected to an input of one of the twenty-six stages of the AOI circuitry 114—114′ of logic 97. Similarly each of the outputs 25Y–0Y of the register 95–96 is connected to another input of one of the stages of AOI circuitry 114—114′. More specifically, as shown in FIG. 7*a*, each of the AOI circuits, i.e. stages, of gating circuitry 114—114′ has the outputs of a pair of two-input AND gates 115, 116 commonly coupled to a series-connected input-OR/output-inverter circuit 117. The signals at each of the outputs 25X–0X is ANDed with the gating signal GX by the AND gate of the appropriate AOI circuit of gating circuitry 114—114′, which AND gate corresponds to AND gate 115. Likewise, the signal at each of the outputs 25Y–0Y is ANDed by the AND gate, which corresponds to the AND gate 116, of the appropriate AOI circuit to which it is applied.

Circuitry 97 includes a pair of inverters 118-119, c.f. FIG. 7a, whose inputs are commonly connected and to which is applied the control signal MSU. Inverter 118 and 119 provide control signals $\overline{SXRR}'$ and $\overline{SYRR}'$, respectively, which periodically clear the registers 93 and 96, respectively, during the frame retrace period.

During the frame generation period each time a signal ΔA is present, it is also applied to the input stage 120 of the eighteen bit counter 102. During the subsequent frame retrace period the gates stages 103, each of which is implemented as a NAND gate 121, under the control of the gating signal GD applied to their common input 103a gates the information at the output in each stage of the counter 102 to a corresponding one of the stages of register 104. Each stage of register 104 is implemented by a flip-flop circuit, e.g. flip-flop 122.

At the end of a frame generation period which follows one in which a DIP characteristic was detected, register 92–93 contains the product ΣX ΔA, register 95–96 contains the product ΣYΔA, and counter 102 contains the factor ΣΔA. At the beginning of line count time period LC501, which corresponds to the beginning of the frame retrace period, gate signal GX is placed in an UP level for two line time periods TL, c.f. FIG. 3B. As a consequence the data bits at the outputs 25X–0X are transferred via the respective AND gates of the AOI circuitry 114—114' to the respective outputs SDB25–SDB0 and from there to the respective stages of the dividend/quotient register 98–99, c.f. FIG. 8. Each of the stages of ten bit register 98 is implemented by a flip-flop circuit, e.g. circuit 123. Similarly the sixteen bit stages of the register 99 are implemented with a flip-flop circuit 124. As explained hereinafter, after each of the division operations for determining the centroids Xc and Yc are performed, the lower nine stages of register 99 provide at their outputs QB0–QB8 binary signals indicative of the particular centroid value. These in turn, as aforementioned, are converted by the BCD converter 106 which stores the binary digital bits in the respective registers 107 and 108. Each stage of the register 107 and 108 is similarly configured and includes a flip-flop circuit 125 whose output is connected via resistor 126 to a schematically shown transistor amplifier 127.

Figure 9:
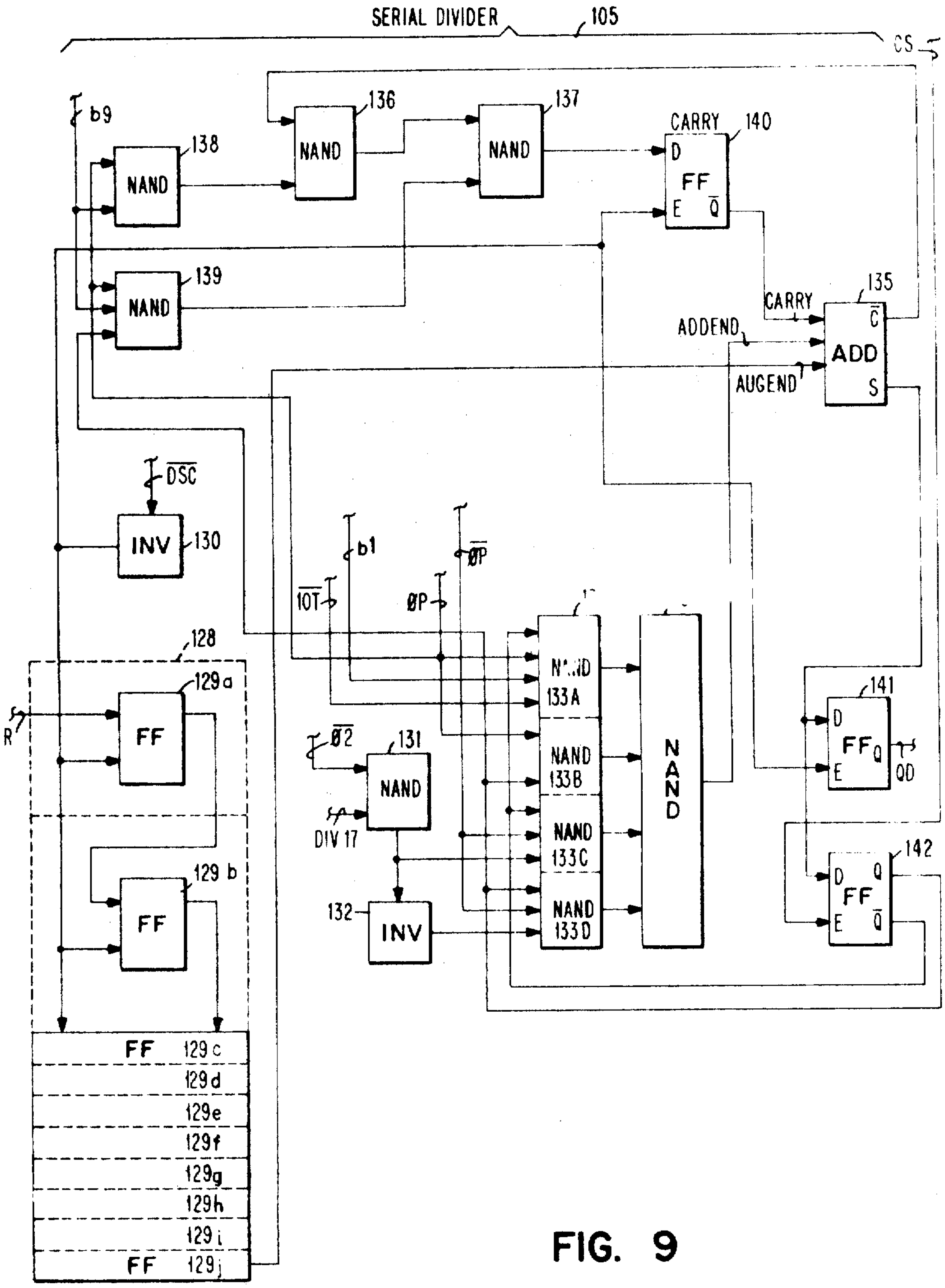
FIG. 9 is a more detailed block diagram of the SERIAL DIVIDER shown in FIG. 6.

Serial divider 105, as shown in FIG. 9, includes a ten stage shift register 128, implemented with flip-flop circuits 129*a*–129*j*. The data R from register 98, c.f. FIG. 8, is fed to the input stage 129*a*. The data in register 128 is shifted under the control of a clock signal $\overline{DSC}$ via inverter 130. NAND gate 131 Nands the signal $\overline{Q2}$ from signal generator 21 and the signal DIV 17 from register 104. The resultant output from NAND gate 131 and its not counterpart provided by inverter 132 are fed to the respective inputs of NAND stages 133C and 133D, respectively, of the four-stage NAND gates 133. The outputs of the four NAND gates 133A–133D are Nanded in turn by NAND gate 134, the output of which is fed to the addend bit input of serial ADDer circuit 135. The augend bit input of ADDer 135 is connected to the output of stage 129*j* of register 128. The not carry output $\overline{C}$ of ADDer 135 is Nanded by gate 136, the output of which is connected to NAND gate 137. A pair of NAND gates 138, 139 have a control signal b9 from signal generator 21 applied to their respective commonly-connected inputs. The other input of NAND gate 138 is commonly connected to another input of the three input NAND gate 139 to which the control signal 0P from generator 21 is applied.

The output of NAND gate 139 is Nanded with the output of NAND gate 136 by NAND gate 137. The output of gate 137 is connected to the data input of flip-flop 140. The clock signal $\overline{DSC}$ is applied to the clock input of flip-flop 140 via inverter 130. The output of flip-flop 140 in turn is connected to the carry input of ADDer 135.

Register stage 141 is used for producing the quotient bit provided at its output QD. The output QD is connected to the input stage of register 99. The sum outputs of ADDer 135 is commonly connected to the respective data inputs of flip-flop 141 and of a control flip-flop stage 142. Clock signal $\overline{DSC}$ is applied via inverter 130 to the clock input of register 141. A clock close signal CS from generator 21 is applied to the clock input of signal 142. The true output Q of flip-flop 142 conditions NAND gates 139, 133B and 133D. The complement output of flip-flop 142 conditions NAND gates 133A and 133C. Control signal 0P conditions NAND gates 139, 133A and 133B. Its not counterpart signal $\overline{0P}$ conditions NAND gates 133C and 133D. Control signals *b*1 and $\overline{10T}$, also condition NAND gate 133A. Signals $\overline{10T}$, *b*1, 0P, $\overline{0P}$ are provided by signal generator 21.

The operation of the centroid processor 15 will now be described. For purposes of explanation, it will be assumed that the aforementioned DIP characteristic has been detected by the historgram processor 11 in the first frame period in accordance with the foregoing description and previous example associated with Table II. As a consequence, the intermediate class associated with the DIP characteristic example is at class 8 and signal ΔA is generated during the second frame generation period only if inter alia the brightness level of the image in the camera's target is at or above level 8.

More specifically, as shown in FIG. 5 with signal DD at an UP level amplifier 69 and lamp 70 of circuit 12A are turned on. The resultant UP level at the output of inverter 73 of circuit 12A when NANDed will be at UP level at signal $\overline{DAL2}$ by NAND gate 76 of circuit 12B causes a DOWN level at the output of NAND gate 76 of circuit 12B. This DOWN level maintains amplifier 69 and lamp 70 of circuit 12B turned off and maintains the output of the NAND gate 77 and 78 of circuit 12B at UP levels. It should be noted that the output of NAND gate 77 of circuit 12B remains at an UP level regardless of the level of signal L2V. The UP level at the output of inverter 78 of circuit 12B and the UP level of signal $\overline{DAL3}$ causes the output of NAND gate 76 of circuit 12C to be in a DOWN level and consequently the amplifier 69 and lamp 70 of circuit 12C are maintained turned-off. As can readily be seen, with signals $\overline{DAL2}$–$\overline{DAL7}$ in UP levels, the amplifiers, e.g. amplifier 69, and lamps, e.g. lamp 70, associated with circuit 12B-12G are turned off. Furthermore, the output of the NAND gates, corresponding to NAND gate 77, of circuits 12B–12G are maintained at UP levels regardless of the levels of signals L2V–L7V, respectively, from converter 10. Hence, signals L2VD–L7VD are all at UP levels.

The NAND gate 76, not shown, of circuit 12H on the other hand is conditioned by the DOWN level of signal $\overline{DAL8}$ in the given example. The UP levels at the output of the inverter 78, not shown, of the preceding circuit 12G, not shown, and the DOWN level of the signal $\overline{DAL8}$ thereby place the output of the NAND gate 76, not shown, of circuit 12H at an UP level and thereby turn on the amplifier 69, not shown, and lamp 70, not shown, of circuit 12H. Moreover, if at any time signal L8V should go to an UP level, the output of NAND gate 77, not shown, of circuit 12H goes to a DOWN level, i.e. signal L8VD goes to a DOWN level.

With the output of NAND gate 76 of circuit 12H in an UP level in the given example, the inverter 78 of circuit 12H will be in a DOWN level. As a result the output of NAND gate 76 of circuit 12I is at an UP level and its amplifier 69 and lamp 70 are turned on. The output of the AND gate, not shown, of AOI circuit 80 which ANDs signal L9V and the output of NAND gate 76 of the circuit 12I, will concurrently be at an UP level whenever signal L9V goes to an UP level. The output of the other AND gate, not shown, of AOI circuit 80, the inputs of which AND gate are commonly connected and fed by signal L10V, will be placed in an UP level whenever signal L10V goes to an UP level. As a consequence, the output of the AOI circuit 80 goes to a DOWN level whenever signal L9V and/or L10V goes to an UP level. Thus during the second frame generator period for the given example, signal L2VD–L7VD will be maintained at UP levels, whereas the level of the signals L8VD will be at DOWN and UP levels in response to the UP and DOWN levels, respectively, of signal L8V. Likewise, the level at the output of AOI circuit 80 will be at DOWN and UP levels in response to the UP and DOWN levels, respectively, of signals L9V and/or L10V.

At the start of the second frame generation period, the beam of camera 3 is at the X = 0, Y = 0 positions of the raster. As the beam moves along the first scan line across the camera target the X address information signals DXC1–DXC256, herein sometimes referred to as the X count signals, are presented in parallel to stages $2^0$–$2^8$, respectively, of the ten bit parallel adder 91 in the decimal sequence 0 to 511. During the first line scan, the Y address signals DYC1–DYC256, sometimes herein referred to as the line count signals, are all at DOWN levels and are presented in parallel to the stages $2^0$–$2^8$, respectively, of adder 94.

Each time the image on the camera's target is at or above the brightness level or class 8, the particular signal L8V, L9V or L10V goes to a DOWN level and as a result the output of NAND gate 81 goes to an UP level. If desired, the signal ΔA may be taken directly from the output of NAND gate 81. However, in order to filter out spurious signals such as may have been caused by cloud cover, for example, the additional logic 82–90 is provided. As such the flip-flops 82–84 are connected as a shift register. The data from NAND gate 81 is fed to the data input D of the input stage 82 and is clocked into the register 82–84 by the UP levels of clock signal ADV provided by signal generator 21 and fed in parallel to the inputs E of stages 82–84. The concurrent presence of an UP level at its D and E inputs causes the output Q of the particular one of the flip-flops 82–84 to be at an UP level. Conversely, the concurrent presence of a DOWN level and an UP level at its D and E inputs, respectively, causes the output Q of the particular one of the flip-flops 82–84 to be at a DOWN level. An UP level at the output of NAND gate 81 indicates in the given example either signal L8VD or the output signal of AOI circuit 80 is at a DOWN level, i.e. the particular image point being sampled on the camera target is at or above the brightness level of the intermediate class 8. A DOWN level at the output of NAND gate 81 indicates in the given example that the particular point being sampled is below the brightness level of the intermediate class 8.

Whenever a DIP characteristic is detected during a given frame period, then at the commencement of the line count time period LC510 associated with the particular frame signal generator 21 provides the control signal MY at an UP level, c.f. FIG. 3B. It also provides the clock signals ADV in the form of a pulse train which have the same periodicity T as the basic clock signal 3MC and which are synchronized therewith. At the beginning of the frame retrace period of the next frame, i.e. its line count time period LC500, the signal MY goes to a DOWN level and the pulse signal ADV terminates. Signals MY and ADV are resumed at line count time period LC510 of the last mentioned frame only if the DIP characteristic is detected concurrently during the same frame. Otherwise signals MY and ADV are not resumed until the line count period LC510 of the frame retrace period of a subsequent frame period in which a DIP characteristic is next detected.

At the beginning of the second frame generation period and each line period thereof, the not counterpart signal LB goes to an UP level, c.f. signal LB shown in FIG. 3B. As a result, at the beginning of each line period flip-flop 87 is cleared, i.e. turned-off, and its output Q is at a DOWN level. NAND gate 89 is thereby inhibited and signal Δ A remains at a DOWN level. Flip-flop 87 thus prevents an UP level in signal ΔA from being generated until three successive data samples from NAND gate 81 in conjunction with the UP levels of the clock signals ADV cause three DOWN levels at the outputs $\bar{Q}$ of flip-flops 82–84. This is advantageous in certain cases.

For example, if the field 1 is covered by a cloud formation commencing at the edge of the frame which corresponds to the edge of the raster from which the line scans commence, and should the cloud formation have brightness levels at or above the brightness level of the detected intermediate class as generally might be the case, then UP levels in the data signal ΔA are prevented from being formed until there appears a clearing over the field as determined by three successive samples which have brightness levels below the brightness level of the particular intermediate class. When three such successive samples are clocked, the outputs $\bar{Q}$ of flip-flop 82–84 will be at UP levels which are detected by NAND gate 86. As a result, the DOWN level at the output of gate 86 sets the output Q of flip-flop 87 to an UP level and clears the output Q of flip-flop 88 to a DOWN level which maintains the NAND gate 89 in an inhibited condition, i.e. signal ΔA remains at a DOWN level.

Thereafter during the particular line scan the output Q of flip-flop 88 will only go to an UP level when three successive UP levels are detected at the outputs Q of flip-flops 82–84 by NAND gate 85 and the resultant output fed to input P of flip-flop 88. When three such successive samples cause the outputs Q of flip-flops 82–84 to be at UP levels, it indicates that the brightness levels of the samples are at or above the brightness levels of the detected intermediate class and from a statistical viewpoint are presumably associated with the target.

With the output Q of flip-flop 88 in an UP level, the output Q of flip-flop 84 is gated by AND gate 89 in response to the concurrent UP levels of the clock signals 3MC and ADV. However, if as the line scan progress three successive samples causes the output Q of flip-flop 82–84 to be at DOWN levels, it indicates that the brightness levels of the three samples are below the detected intermediate class and hence presumably are not associated with the target. As a result, the output Q of flip-flop 88 goes to a DOWN level, thereby placing signal ΔA at a DOWN level until three more successive samples in the line scan cause UP levels at outputs Q of flip-flops 82–84 and the resultant clocking of the signal ΔA is resumed.

Thus, as can readily be seen, depending on the brightness level distribution pattern of the field 1, flip-flop 88 once cleared during a given line scan, i.e. its output Q set to a DOWN level, can thereafter be intermittently set to UP and DOWN levels during the particular line scan and it is only when it is in such UP levels that the output Q of flip-flop 84 is gated by NAND gate 89. Under the last described circumstance, signal ΔA will be at an UP level, i.e. the condition of outputs Q of flip-flops 87-88 at UP levels, whenever the output Q of flip-flop 84 is in an UP level, the latter indicating the presence of a point in the field having a brightness level at or above the detected intermediate level.

Any offset between the actual signal ΔA data and corresponding X and Y or line count addresses due to the presence of logic 82–90 is negligible and/or may be adjusted by appropriate programming of the CPU 16 and/or providing additional logic to compensate therefor.

When the second frame retrace period begins, the ΣxΔA, ΣyΔA, and ΣΔA factors will be stored in the registers 91–93, 95–96, and 102, respectively. At line count time period 500, i.e. commencement of the second frame retrace period, signal GX goes to an UP level and the information from register 92–93 is transferred to the register 98–99, c.f. FIG. 3B. It should be noted register 98–99 had been previously cleared by signal SRR during line count time period LC510 of the first frame, c.f. FIG. 3B.

The centroid processor 15 is now ready to compute the centroid Xc or quotient of equation (1) by dividing the dividend factor ΣxΔA by the divisor factor ΣΔA. A division method is employed in which initially during the first iteration a 1 bit is placed in the quotient and the divisor bits are subtracted serially from a corresponding number of the highest order bits of the dividend. The remainder of the first iteration is shifted one bit position toward the higher order. If the first remainder is positive then during the next iteration a 1 bit is added to the quotient and the divisor is again subtracted from the shifted first remainder. However, if the first remainder is negative a 1 bit is subtracted from the quotient during the aforementioned next iteration and the divisor is added to the shifted first remainder. A number of successive iterations are performed until a predetermined number of quotient bits are obtained, the resulting remainder of a given iteration being shifted before the addition or subtraction, as the case might be, of the succeeding iteration.

Figure 3C:
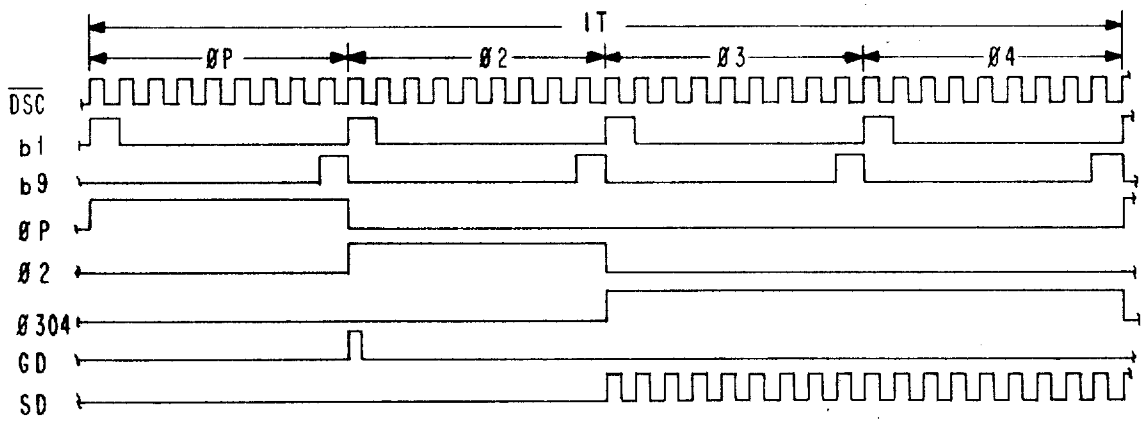
Figures 10A, 10B, 10C, 10D, 10E, 10F:
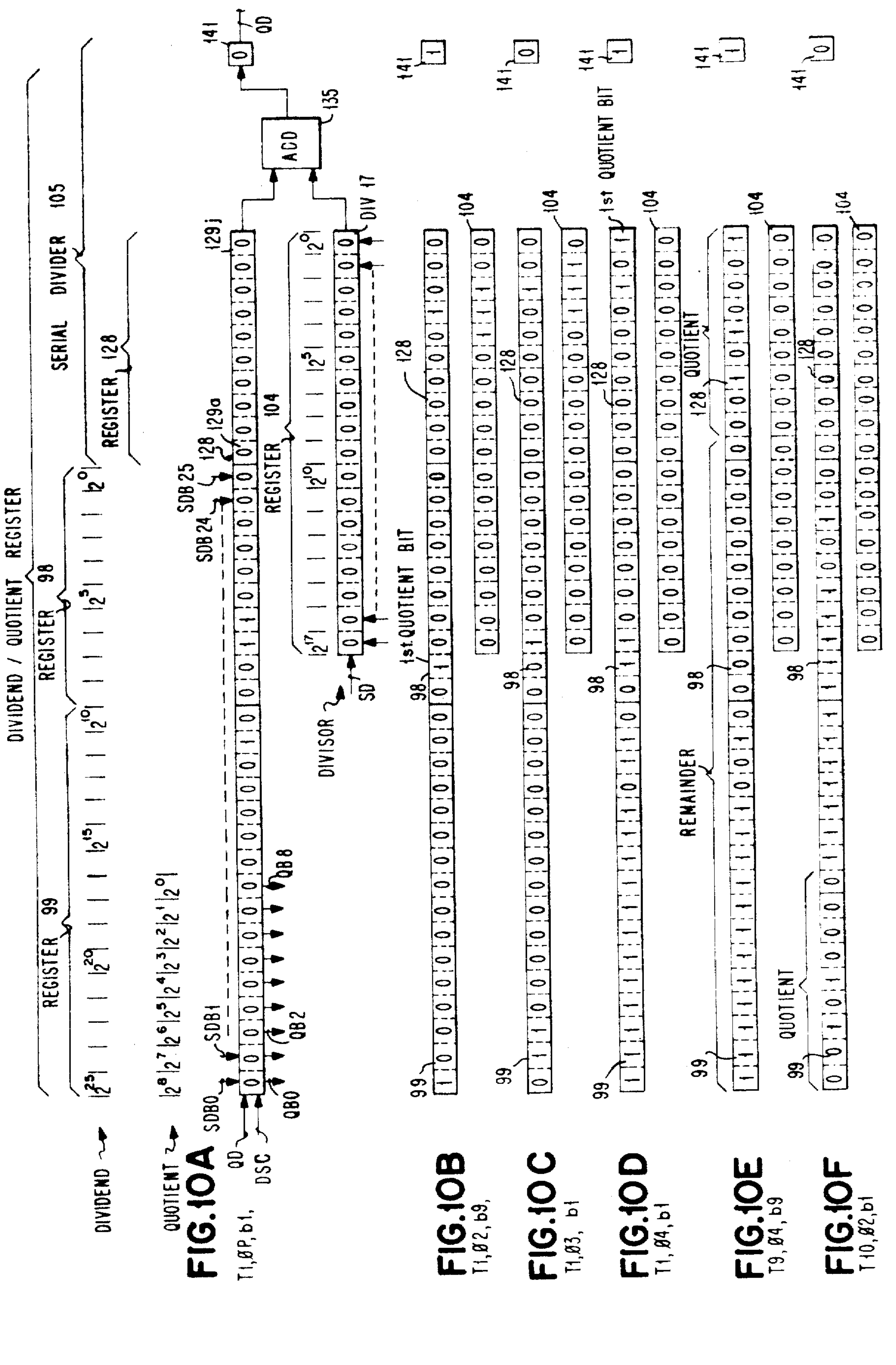
FIG. 10A–10F are simplified data flow diagrams of example data through certain registers of the centroid processor which occurs during the division process thereof.

The foregoing division process will now be described with reference to the waveforms of FIGS. 3C and 3D and a given simple example in which the dividend is a binary 100011000000 = $2^{11} + 2^7 + 2^6 = $ 2240 and the divisor is a binary 11100 = $2^4 + 2^3 + 2^2 = 28$. In FIGS. 10A–10F, there are shown simplified block diagrams of the data flow for the given example through the register 99, 98, 128, 141 and 104 at different times during certain iterations. In FIGS. 10B–10F the adder circuit 135 is omitted for sake of clarity. Register 99, 98, 120 and 141 form a thirty-seven stage shift register, hereinafter referred to as the DIVIDEND/QUOTIENT register. In FIG. 10A, the dividend binary weights $2^0 - 2^{35}$ associated with the stages of registers 99 and 98 are indicated for sake of clarity. Likewise, the quotient binary weights associated with the stages of register 99 is shown in FIG. 10A, as well as the divisor binary weights associated with the stages of the register 104. The output QD of register 141 is fed back to the dividend highest order stage $2^{35}$ of register 99. At the beginning of line count time period LC502, the signal generator 21 provides the close signal $\overline{DSC}$ which is derived from the basic clock signal 3MC and has a corresponding periodicity T, c.f. FIG. 3C.

A total of 36 pulses of signal $\overline{DSC}$ are provided during each iteration. Each iteration is divided into four phases identified by reference characters 0P, 02, 03, 04 and appropriate signals 0P, 02, and 0304 are provided by signal generator 21, c.f. FIG. 3C. Nine successive iterations 1T–9T are used to form a nine bit quotient. A tenth iteration is provided to align the quotient bits in the proper stages of register 99 as will become apparent hereinafter. Signal generator 21 also provides a continual signal 10T synchronized with each tenth iteration. During the quotient phase 0P of each iteration a quotient bit is formed. During the second phase of each iteration the gating signal GD is provided by signal generator 21 which gates the information from register 102 into the register 104. During the third and fourth phases 03 and 04 of each iteration both the information in the Dividend/Quotient register and in register 104 are shifted simultaneously in the same direction and the data bits appearing at the dividend stage 129j and divisor stage $2^0$ of register 104 are serially subtracted or added as the case might be by adder 135. With each such addition or subtraction the sum bit developed in the adder is placed in the register 141.

Just prior to the first iteration time the stages $2^{11}$, $2^7$, and $2^6$ of registers 99 and 98 will have binary ones stored therein in the case of the given example and the remaining stages of registers 99 and 98 and of stages 149 and 148 will be the DOWN levels. Likewise, the stages $2^4$, $2^3$, $2^2$ of register 102 will have binary ones stored therein and the remainder of its stages will have binary zeros. At the commencement of the first iteration 1T signal b1 goes from a DOWN to an UP level which causes via circuit 133 a resultant change in the output of NAND gate 134, c.f. FIG. 9, from a DOWN to an UP level. The UP level of NAND gate 134 causes the sum output S of circuit 135 to provide a binary one level at the output QD of register 141. This binary one level is the first quotient bit. Thus just prior to the time period when the first pulse of signal $\overline{DSC}$ goes from its UP to its DOWN level the information in the Dividend/Quotient register and register 104 appear as shown in FIG. 10A for the given dividend and divisor example. During this time period when signal b1 is at an UP level, the first pulse of signal $\overline{DSC}$ goes from an UP to a DOWN level and the data in the Dividend/Quotient register is shifted one place to the right and the aforementioned quotient bit 1 is entered into stage 141.

Thereafter, as each successive pulse of signal $\overline{DSC}$, after being inverted by the inverters 101 and 130, c.f. FIG. 8 and 9, is applied during the first and second phases 01 and 02 the information is shifted in the Dividend/Quotient register one additional position to the right whereas the information in register 104 remains in place. At the beginning of the second phase 02, signal GD gates the information of register 102 into register 104. Thus, as shown in FIG. 10B at the end of the eighteenth pulse of signal $\overline{DSC}$ which is associated with the second phase 02 of the first iteration 1T the information in the Dividend/Quotient register will have been shifted eighteen positions to the right and hence the dividend data bit originally stored in the highest order stage $2^{35}$ of register 99 is now aligned with the highest order divisor bit located in the $2^{17}$ stage of register 104.

At the commencement of the third phase 03 of the first iteration, clock signal SD, which is complementary to and synchronized with the clock signal $\overline{DSC}$, shifts the divisor data bits to the right in register 104 simultaneously with the shifting of the dividend data bits in the Dividend/Quotient register by the inverted signal $\overline{DSC}$. As a result, as each divisor data bit in the stage $2^0$ of register 104 is so shifted it is subtracted serially from the dividend data bit of stage 129j, being concurrently shifted therewith, in the adder circuit 135 and their resultant remainder bit is placed in register 141. The data alignment at the end of the first pulse b1 of phase 03 of the first iteration 1T is shown in FIG. 10C. By the end of the fourth phase 04 of the first iteration the highest order bit of the divisor has now passed out of the stage $2^0$ of register 104, c.f. FIG. 10D and the clock signals SD are terminated. It should be noted that register 104 is now cleared. Also, the previously generated first quotient bit is now in the stage 129*j* of the Dividend/Quotient register and is illustrated in FIG. 10D with the actual remainder bit obtained as a result of the subtraction operation performed during the first iteration for the given dividend and divisor example.

Also during pulse b9 of each phase 04 the clock signal CS is generated. This causes flip-flop 142 to sense or detect the output level at the sum output S of adder 135. If the sum bit is a binary 1, which indicates that the remainder is negative, it sets the Q output of flip-flop 142 to an UP level. Thus UP level conditions NAND gate 133B to subtract the next quotient bit from the quotient and it also conditions NAND gate 133D to add the divisor to the remainder for the next iteration. Otherwise, if the sum bit when sensed is a binary 0, which indicates that the remainder is positive, it clears the flip-flop 142 placing its output $\overline{Q}$ to an UP level which conditions NAND gate 133A to add the next quotient bit to the quotient and it also conditions NAND gate 133C to subtract the remainder for the next iteration.

It can readily be demonstrated as is apparent to those skilled in the art, that for the given divisor and dividend example, at the end of the iteration 9T, the remainder and quotient digits will be aligned in the Quotient/Dividend registers with the values shown in FIG. 10E and at the end of pulse b1 of the second pulse 02 of the tenth iteration 10T, the quotient digits will be appropriately aligned in the stages of register 99 having the outputs QB0–QB8. Thus, for the given example, the outputs QB2 and QB4, which represent the binary weight $2^6$ and $2^4$, respectively, will be at UP levels and the outputs QB1, QB3, QB5–QB8 at DOWN levels resulting in the binary quotient $2^6 + 2^4 = 80 = Xc$ for the given example. At this time, BCD converter 106 is gated by signal LBC, c.f. FIG. 3D, whereas Xc is converted by the BCD converter 106 and transferred into register 107, the latter having been previously cleared by signal $\overline{XG}$.

At line count time period LC503 the Dividend/Quotient register is cleared and the centroid processor is now ready to compute the centroid Yc or quotient of equation (2) by dividing factor $\Sigma$ Y $\Delta$ A by the divisor factor $\Sigma$ $\Delta$ A. At line count time period LC504 the gating signal GY transfers the information from register 95–96 to register 98-99. At line count time period LC506, c.f. FIG. 3B, a similar division process is performed and the centroid Yc computed, converted by BCD106, and stored in register 108. At line count time period LC510, the Dividend/Quotient registers are again cleared.

The implementation of the BCD converter 106 and/or signal generator 21, which provides the various control signals, is within the skill of one familiar with the art and hence will not be described.

After the second frame period, an aforedescribed histogram processor cycle occurs with each new frame period of camera 3, and an aforedescribed centroid processor cycle occurs in the next frame period following one in which a DIP characteristic is detected.

As is obvious to those skilled in the art, while the invention has been described with particular circuit configureations and types, and a preferred mode of operation, it is to be understood that the invention may be practiced with other configurations and/or types and/or operational modes as is apparent to those skilled in the art. Thus, for example, while the various logic and control circuitry is described herein as with mostly negative type logic, the circuitry may be modified to use exclusively positive logic. The circuitry may be modified to use exclusively positive logic types or exclusively negative logic of the same or different types, or combinations thereof. It is also to be understood that the number of samples per frame and/or the frame parameters, e.g. number of lines per frame, frame rate, etc., may also be modified accordingly. It is to be also understood that the histrogram processor 11 can be modified to detect for the presence of a low contrast object located in a field having a high contrast background.

Thus, while the invention has been particularly shown and described with reference to a preferred embodiment thereof, it will be understood by those skilled in the art that various changes in form and details may be made therein without departing from the spirit and scope of the invention.

We claim:

1. In a data processing system for processing at least three data signals of the histrogram type, each of said data signals being associated with a mutually exclusive different predetermined class of the histrogram represented thereby, the improvement comprising: means for providing said data signals, and detection means responsive to said data signals for detecting for a predetermined characteristic in said histrogram, said characteristic being the presence of at least one of said signals associated with an intermediate class of said histogram that has a frequency of occurrence less than the respective frequencies of occurrence associated with the adjacent classes thereto.

2. A data processing system according to claim 1 wherein said detection means comprises means for providing a signal representing the particular intermediate class associated with said predetermined characteristic whenever said predetermined characteristic is detected thereby.

3. A data processing system according to claim 1 wherein said data signals are digital signals, said detection means further comprising:

a plurality of counter means, each of said data signals being stored in an exclusive one of said counter means;

means for overflowing said counter means; and logic means responsive to said overflows for providing an output signal whenever said characteristic is present in said histrogram.

4. A data processing system for processing information representing a function having a variable parameter, said system comprising:

means for converting the information into at least three converted data signals proportional to the frequency distribution of said variable parameter, each of said converted signals being associated with a mutually exclusive different preselected value of said parameter; and detection means responsive to the aforementioned converted signals for detecting whether at least one of the converted signals associated with an intermediate one of the preselected values has a frequency of occurrence less than the respective frequencies of occurrences of the converted signals associated with the adjacent values thereto.

5. A data processing system according to claim 4 wherein said detection means comprises means for providing a signal representing the particular intermediate class associated with said predetermined characteristic whenever said predetermined characteristic is detected thereby.

6. In a data processing system according to claim 4 wherein said data signals are digital signals, said detection means further comprising:

a plurality of counter means, each of said data signals being stored in an exclusive one of said counter means;

means for overflowing said counter means; and logic means responsive to said overflows for providing an output signal whenever said characteristic is present in said histogram.

7. Brightness level discriminator apparatus for detecting the presence of an object in a field of view, said apparatus means comprising:

scanning means for scanning said field, said scanning means providing a first output signal proportional to the brightness level distribution pattern of said field;

means for converting said first output signal into at least three converted signals of the histogram type indicative of said distribution pattern, each of said converted signals being associated with a mutually exclusive different predetermined class of the histogram represented thereby; and detection means responsive to the aforementioned converted signals for detecting whether at least one of the converted signals associated with an intermediate one of the preselected values has a frequency of occurrence less than the respective frequencies of occurrences of the converted signals associated with the adjacent values thereto.

8. Brightness level discriminator apparatus according to claim 7 wherein said detection means comprises means for providing a second output signal representing the particular intermediate class associated with said predetermined characteristic whenever said predetermined characteristic is detected thereby.

9. Brightness level discriminator apparatus according to claim 7 wherein said converted signals are digital signals, said detection means further comprising:

a plurality of counter means, each of said converted signals being stored in an exclusive one of said counter means;

means for overflowing said counters; and logic means responsive to said overflows for providing a third output signal whenever said characteristic is present in said histogram.

10. Brightness level discriminator apparatus according to claim 7 further comprising:

arithmetic means response to said detector means for computing the centroids of said object whenever said characteristic is detected thereby.

11. In an autonomous navigational system for detecting the presence of a predetermined navigational reference object in a field of view, the improvement comprising:

scanning means for scanning said field, said scanning means providing a first output signal proportional to the brightness level distribution pattern of said field;

means for converting said first output signal into at least three converted signals of the histogram type indicative of said distribution pattern, each of said converted signals being associated with a mutually exclusive different predetermined class of the histogram represented thereby;

detection means responsive to the aforementioned converted signals for detecting whether at least one of the converted signals associated with an intermediate one of the preselected values has a frequency of occurrence less than the respective frequencies of occurrences of the converted signals associated with the adjacent values thereto; and arithmetic means response to said detection means for computing the centroids of said object whenever said characteristic is detected thereby.

12. An autonomous navigational system according to claim 11, wherein said data signals are digital signals, said detection means further comprising:

a plurality of counter means, each of said converted signals being stored in an exclusive one of said counter means;

means for overflowing said counters; and logic means responsive to said overflows for providing a second output signal whenever said characteristic is present in said histogram.

* * * * *